US009893664B2

(12) United States Patent
Pallett et al.

(10) Patent No.: US 9,893,664 B2
(45) Date of Patent: Feb. 13, 2018

(54) METHODS AND SYSTEMS FOR EFFICIENT ENGINE TORQUE CONTROL

(71) Applicant: Ford Global Technologies, LLC, Dearborn, MI (US)

(72) Inventors: Tobias John Pallett, Farmington, MI (US); Christopher John Teslak, Plymouth, MI (US); Yanan Zhao, Ann Arbor, MI (US); Nicholas Dashwood Crisp, Benfleet (GB); Rajit Johri, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 14/702,540

(22) Filed: May 1, 2015

(65) Prior Publication Data

US 2016/0319758 A1  Nov. 3, 2016

(51) Int. Cl.
*H02P 9/00* (2006.01)
*F02D 41/12* (2006.01)
(Continued)

(52) U.S. Cl.
CPC ............ *H02P 9/008* (2013.01); *F02D 41/107* (2013.01); *F02D 41/123* (2013.01); *F02P 5/1504* (2013.01); *F02D 37/02* (2013.01); *F02D 41/0002* (2013.01); *F02D 41/126* (2013.01); *F02D 2250/18* (2013.01); *F02D 2250/22* (2013.01); *F02D 2250/24* (2013.01); *F02P 5/045* (2013.01); *Y02T 10/46* (2013.01)

(58) Field of Classification Search
CPC ............. F02D 13/06; F02D 2041/0012; F02D 2250/21; F02D 41/123; F02D 41/126; F02D 41/0087; F02D 17/02; F02D 41/107; F01L 13/0005; H02P 9/008; F02P 5/1504
USPC .................. 123/198 DB, 198 DC, 198 F, 325
See application file for complete search history.

(56) References Cited

U.S. PATENT DOCUMENTS

| 4,311,123 A * | 1/1982 | Glockler ............... F02D 41/123 |
| | | 123/325 |
| 5,528,148 A | 6/1996 | Rogers |

(Continued)

OTHER PUBLICATIONS

Demarco, J. et al., "Engine Speed Control via Alternator Load Shedding," U.S. Appl. No. 14/614,881, filed Feb. 5, 2015, 50 pages.

*Primary Examiner* — Sizo Vilakazi
(74) *Attorney, Agent, or Firm* — Julia Voutyras; McCoy Russell LLP

(57) ABSTRACT

Method and systems are provided for adjusting an engine torque in response to changes in a desired engine torque. In one example, a method may comprise responsive to increasing desired engine torques, monotonically decreasing an alternator torque to a first level from a second level when not injecting fuel to engine cylinders, and stepping up the alternator torque from the first level to the second level while initiating engine combustion, and then monotonically decreasing the alternator torque from the second level to the first level in response to the alternator torque reaching the first level. In this way, a method may comprise adjusting a load exerted on an engine by an alternator mechanically coupled to said engine during both cylinder combustion, and during non-fueling conditions.

19 Claims, 5 Drawing Sheets

(51) Int. Cl.
F02D 41/10 (2006.01)
F02P 5/15 (2006.01)
F02P 5/04 (2006.01)
F02D 37/02 (2006.01)
F02D 41/00 (2006.01)

(56) References Cited

U.S. PATENT DOCUMENTS

| | | |
|---|---|---|
| 7,036,484 B2 | 5/2006 | Mathews et al. |
| 7,245,038 B2 | 7/2007 | Albertson et al. |
| 7,933,711 B1* | 4/2011 | Ulrey .................... F02D 41/008 |
| | | 123/179.16 |
| 2003/0033068 A1* | 2/2003 | Kawai .................. B60H 1/3222 |
| | | 701/54 |
| 2004/0142790 A1* | 7/2004 | Tomura .................. B60K 6/445 |
| | | 477/2 |
| 2006/0048734 A1* | 3/2006 | Kataoka ................. B60K 6/485 |
| | | 123/179.4 |
| 2009/0145381 A1* | 6/2009 | Watanabe ............. B60W 10/06 |
| | | 123/90.15 |
| 2014/0073478 A1* | 3/2014 | Hashemi ............... F02D 41/042 |
| | | 477/5 |
| 2015/0066292 A1 | 3/2015 | Macfarlane et al. |

\* cited by examiner

METHODS AND SYSTEMS FOR EFFICIENT ENGINE TORQUE CONTROL

FIELD

The present application relates to methods and systems for controlling the torque of an internal combustion engine while optimizing fuel economy.

BACKGROUND/SUMMARY

Speed and torque control systems for internal combustion engines change throttle position and fuel injection amount to increase or decrease engine torque to a desired torque. Thus, during engine operating conditions where the actual delivered engine torque is greater than a driver requested engine torque, the throttle may be adjusted to decrease airflow to the engine. Accordingly, the fuel injection may be decreased. Because the throttle is coupled to the air intake valve of multiple cylinders through an intake manifold, there is a delay time before the change in throttle position results in a change in engine torque. Since adjusting the throttle position does not provide an immediate change in engine torque, the ignition timing is retarded to provide a faster response time. In the description herein, ignition timing may also be referred to as spark timing. Further, retarding ignition timing may also be referred to as spark retard. Therefore, the throttle position and ignition timing may both be adjusted to match the engine torque to the desired engine torque. In one example, spark retard may be employed in response to decreases in the driver requested engine torque. Thus, in order to provide a more instantaneous response to decreases in the desired engine torque, the ignition timing may be retarded.

In another example, spark retard may be employed when the driver requested engine torque increases from a level where fuel injection is off to a level where fuel injection is turned on. Under engine operating conditions where the desired engine torque drops below a threshold, such as during vehicle deceleration, fuel injection may be shut off and the vehicle wheels provide a force necessary to keep the engine running. This strategy is commonly referred to as deceleration fuel shut-off (DFSO), and provides improved fuel efficiency during low engine torque conditions. However, when the driver requested engine torque increases above the threshold where fuel injection is turned back on, the increase in engine torque resulting from the fuel injection may be greater than the driver requested increase in engine torque. As a result, in such conditions, the engine torque may exceed the desired engine torque. In order to reduce the delivered torque to more precisely match the driver requested torque in such conditions, spark retard may be employed.

The inventors herein have recognized that retarding ignition timing reduces fuel economy. In one example, some of the above issues may be addressed by a method comprising, as a desired engine torque increases, when not injecting fuel to engine cylinders, monotonically decreasing an alternator torque to a first level from a second level; and in response to the alternator torque reaching the first level, stepping up the alternator torque from the first level to the second level while initiating engine combustion, and then monotonically decreasing the alternator torque from the second level to the first level. In this way, less spark retard can be used, while still reducing delayed torque response and increasing energy capture in the vehicle battery.

In another representation, a method may comprise: during DFSO, when a throttle valve is in a first position and fuel is not injected to one or more engine cylinders, monotonically decreasing alternator torque to a first torque from a second torque as desired engine torque increases up to a first level, and during cylinder combustion, maintaining position of the throttle valve in a second position and monotonically decreasing alternator torque from the first torque to the second torque as desired engine torque increases from the first level to a second level. In some examples, the method may further comprise adjusting the position of the throttle valve between the second position and a third position as desired engine torque increases above the second level.

In another representation, the method may additionally comprise retarding spark timing from a desired spark timing during cylinder combustion, when the alternator torque is at the second level, and engine torque is greater than desired.

In this manner, fuel economy is improved by reducing the usage of spark retard, and a faster engine torque response time is provided by adjusting alternator torque in response to changes in a desired engine torque. Thus, the alternator torque may be used to adjust engine torque during both cylinder combustion, and when fuel is not being injected to the engine such as during a DFSO condition.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
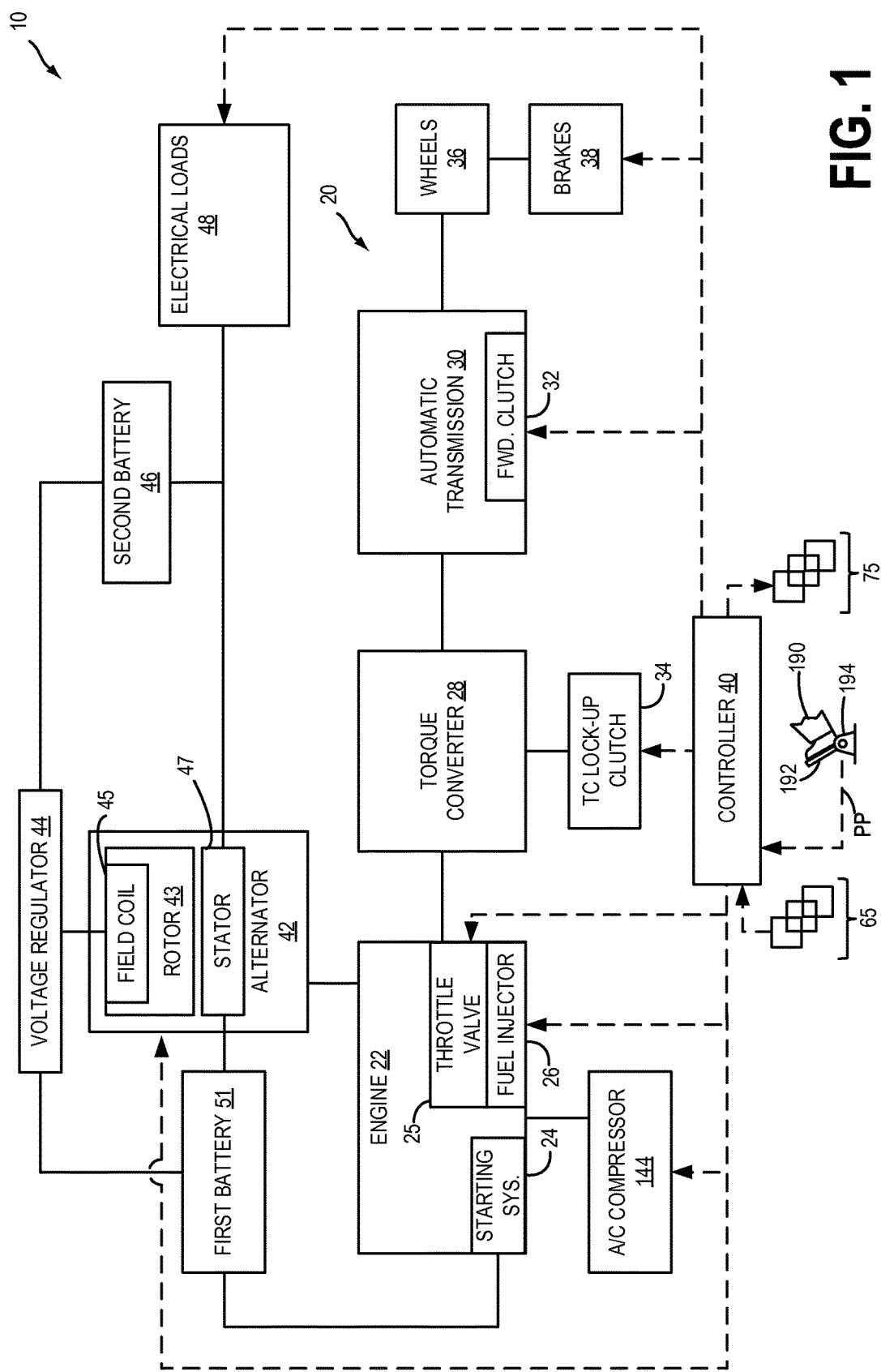
FIG. 1 shows an example vehicle system layout.
Figure 2:
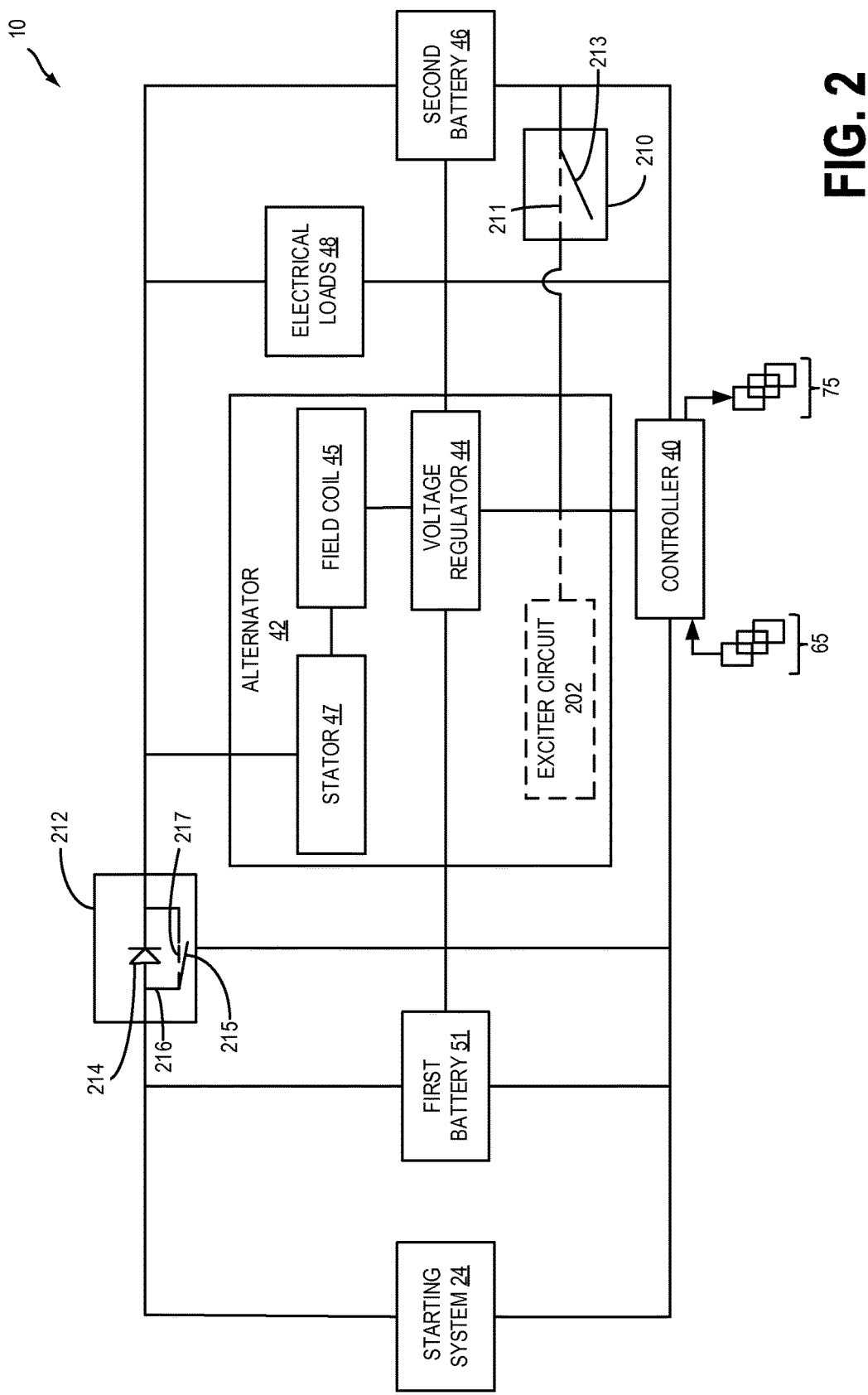
FIG. 2 shows an example electrical circuit for the vehicle system shown in FIG. 1.

The following description relates to systems and methods for adjusting engine torque in response to driver requested changes in engine torque. Engine torque may be adjusted by adjusting a fuel injection amount and correspondingly an intake air flow, spark timing, and alternator torque. A vehicle system, as shown in FIG. 1, may be configured with an alternator that is mechanically coupled to an engine. In one example, a current and/or voltage may be applied to a field coil of the alternator which may generate an alternator output current that may then be used to power various electrical loads (e.g., ancillary electrical devices) and charge one or more batteries as shown in FIG. 2. However, in some examples, when alternator output current is insufficient to power the various electrical loads, current may be drawn from the one or more batteries may to meet the electric power demands of the electrical loads.

Additionally, since the alternator is mechanically coupled to the engine, the current applied to the field coil of the alternator may be configured to adjust a load applied to the engine. Thus, in some examples, the alternator torque and spark timing may be adjusted to adjust the engine torque in responses to changes in the driver requested engine torque. For example, in response to decreases in the driver requested engine torque, a voltage and/or current to the field coil may be increased to provide an additional load and braking force to the engine as described in the method of FIG. 3. Additionally or alternatively, the spark timing may be retarded to reduce the engine torque in response to decreases in the driver requested engine torque.

However, the alternator load on the engine is limited to the capacity of the vehicle's electrical system to use and/or store the electric power produced by the alternator. Thus, as the current and/or voltage applied to the field coil is increased, the alternator load increases, but so does the electric power produced by the alternator. Thus, the vehicle system may include two batteries for providing increased storage capacity for the current and/or voltage produced by the alternator as shown in FIGS. 1-2. As such, the range of voltages and/or current that may be applied to the field coil, and therefore the braking force exerted on the engine by the alternator may be increased.

Figure 4:
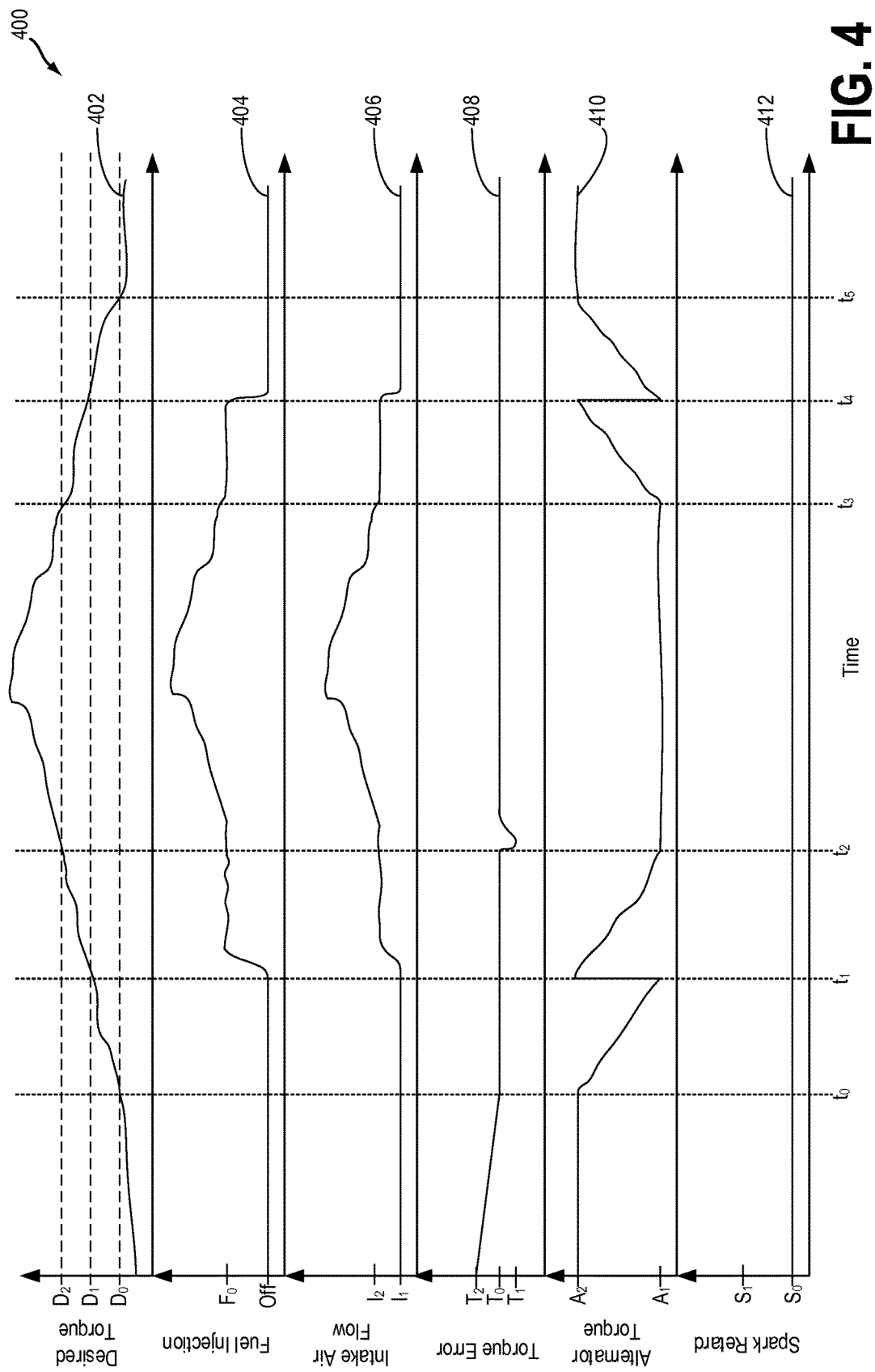
FIG. 4 shows a graph depicting changes in an alternator torque in response to changes in engine operating conditions.
Figure 5:
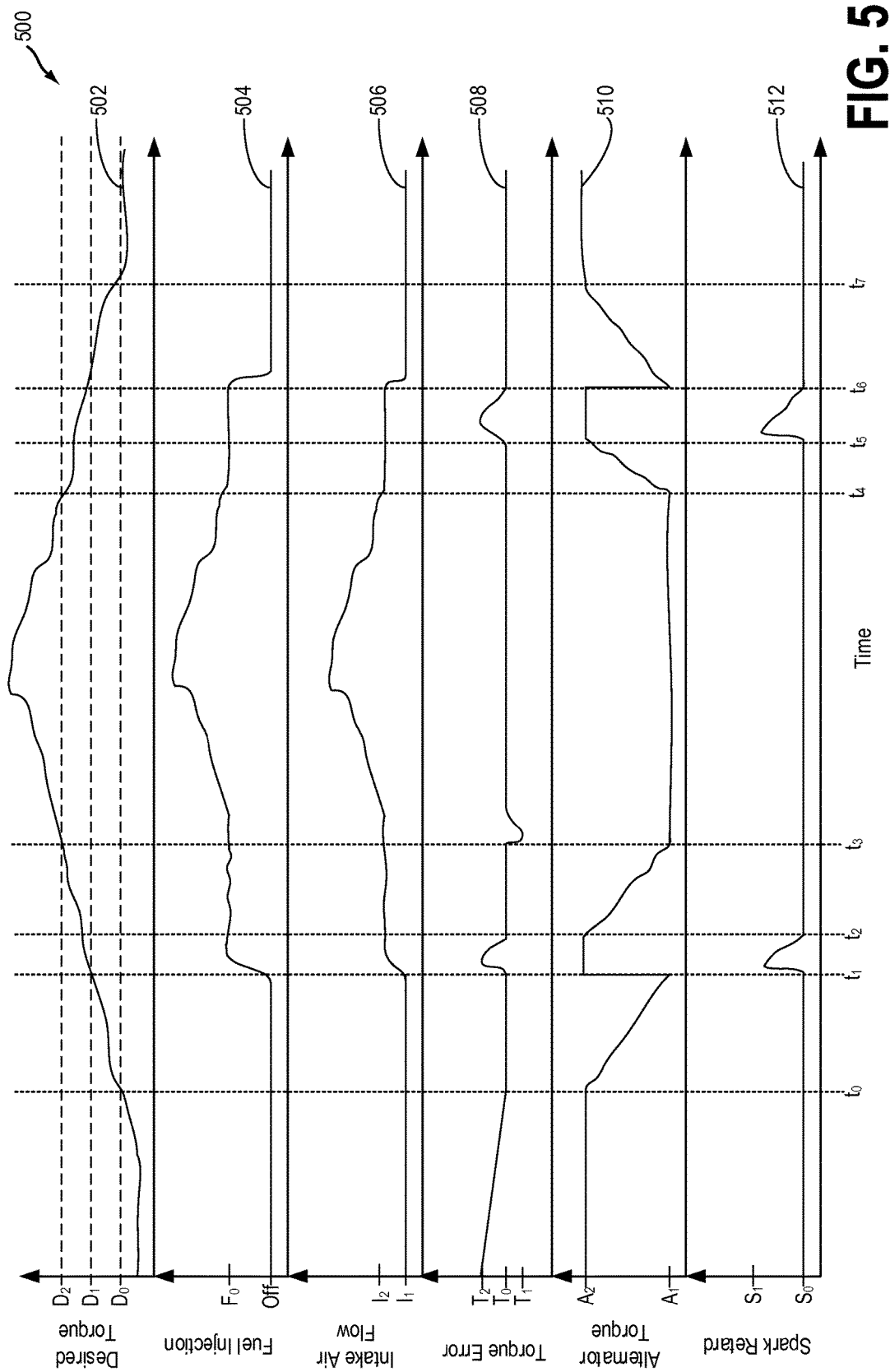
FIG. 5 shows a graph depicting changes in an alternator torque and spark retard in response to changes in engine operating conditions.

Therefore, due to the increased braking force provided by the alternator, the usage of spark retard may be reduced. As shown in FIGS. 4-5, the driver requested engine torque may change over a duration of engine use. In some examples, as shown in FIG. 4, within a first range of driver requested engine torques only the alternator torque and not the spark timing may be adjusted to compensate for changes in the driver requested engine torque and adjust the engine torque to match the driver requested torque. In other examples, as shown in FIG. 5, the spark timing may only be retarded, when the alternator torque is at an upper threshold, fuel injection is at a lower level, and the engine torque is greater than the driver requested engine torque. In this way, spark retard may only be used reduce engine torque when increasing the alternator torque to the upper threshold is insufficient to bring about the driver requested decrease in engine torque. As such, the usage of spark retard may be reduced, and the fuel efficiency of the vehicle system may be improved.

FIG. 1 shows a block diagram layout of a vehicle system 10, including a vehicle drive-train 20. The blocks shown in FIG. 1, which represent components of vehicle system 10, may be connected to one another by solid lines. The solid lines represent physical and/or electrical connections. As such, blocks connected to one another by solid lines in FIG. 1, represent components of vehicle system 10 that are directly physically, and/or electrically connected to one another. Further, dashed lines in shown in FIG. 1 represent electrical connections between controller 40 of vehicle system 10 and various components of vehicle system 10.

Drive-train 20 may be powered by engine 22. In one example, engine 22 may be a gasoline engine. In alternate examples, other engine configurations may be employed, for example a diesel engine. Engine 22 may be started with an engine starting system 24, including a starter. In one example, the starter may include an electrical motor. The starter may be configured to support engine restart at or below a predetermined near zero threshold speed, for example at or below 50 rpm, or 100 rpm. Starting system 24 may be powered by first battery 51. In some examples, battery 51 may be a lead acid battery. However, in other examples, battery 51 may be a super capacitor. In still further examples battery 51, may be any suitable electrical energy storage device, such as a battery, super capacitor, capacitor, etc. Further, battery 51 is electrically coupled to the starting system 24 for providing power to the starting system 24 during an engine start and/or restart. Torque of engine 22 may be adjusted via torque actuators, such as a fuel injector 26, throttle valve 25, camshaft (not shown), etc. Specifically, torque of engine 22 may be controlled by adjusting an amount of intake air flowing to the engine via a position of a throttle valve (not shown), an amount of fuel injected to the engine by fuel injector 26, and a spark timing.

The position of the throttle valve 25 may be adjusted between a first position and a third position, and/or any position therebetween, to adjust the amount of intake air flowing to the engine. Specifically, the throttle valve 25, may be an electronic valve in communication with controller 40, so that the controller 40 may send signals to the electronic actuator of throttle valve 25, for adjusting the position of the valve 25. When the throttle valve 25 is in the third position, a greater amount of intake air flows to the engine than when the throttle valve 25 in the first position. The throttle valve 25 may be adjusted to the first position when fuel is not being injected by the fuel injector 26. Further, the throttle valve 25 may be adjusted to a second position, which is between the first position and the third position so that a greater amount of air flows to the engine 22 than in the first position, but less than in the third position, when the amount of fuel injected by the fuel injector 26 is at a lower first amount. Thus, the amount of intake air flowing to the engine 22 through the throttle valve 25, may increase with increasing deflection of the throttle valve 25 from the first position to the third position. Additionally, the spark timing may be adjusted to adjust the torque output by the engine 22. Specifically, the torque output by the engine 22 may decrease with increasing retardation in spark timing. Thus, the spark timing may be retarded to a point later in the compression stroke of one or more cylinders of engine 22 (e.g., closer to the top dead center position of the one or more cylinder of engine 22), to reduce the power output by engine 22, and thereby reduce the engine torque.

Torque output by engine 22 may be transmitted to torque converter 28 to drive an automatic transmission 30. In some examples, the torque converter may be referred to as a component of the transmission. The output of the torque converter 28 may be controlled by torque converter lock-up clutch 34. When torque converter lock-up clutch 34 is fully disengaged, torque converter 28 transmits torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter 28 clutch to an input shaft (not shown) of transmission 30. Alternatively, the torque converter lock-up clutch 34 may be partially engaged, thereby enabling the amount of torque relayed to the transmission to be adjusted.

Torque output from the automatic transmission 30 may in turn be relayed to wheels 36 to propel the vehicle. Specifically, automatic transmission 30 may adjust an input driving torque at the input shaft (not shown) responsive to a vehicle traveling condition before transmitting an output driving torque to the wheels. For example, transmission torque may be transferred to vehicle wheels 36 by engaging one or more clutches, including forward clutch 32. As such, a plurality of such clutches may be engaged, as needed. Further, wheels 36 may be locked by engaging wheel brakes 38. In one example, wheel brakes 38 may be engaged in response to the driver pressing his foot on a brake pedal (not shown). In the same way, wheels 36 may be unlocked by disengaging wheel brakes 38 in response to the driver releasing his foot from the brake pedal.

Vehicle system components outside of the drivetrain may include an alternator 42, the first battery 51, a second battery 46, and auxiliary electrical loads 48. Auxiliary electrical loads 48 may include: lights, radio system, HVAC systems (for heating and/or cooling a vehicle cabin), seat heater, rear window heaters, cooling fans, etc. Alternator 42 may be configured to convert the mechanical energy generated while running engine 22 to electrical energy for powering the electrical loads 48 and charging the first and second batteries 51 and 46, respectively. As described above, first battery 51 may be a lead acid battery. In some examples, second battery 46 may be a lithium-ion battery. In other examples, second battery 46 may be a lead acid battery. In further examples, second battery 46 may be a super capacitor. In still other examples, battery 46 may be an suitable electrical energy storage device such as a battery, capacitor, super capacitor, etc.

An air conditioning (A/C) compressor 144 may also be connected to the engine 22. The air conditioning compressor 144 compresses and transfers refrigerant gas. The engine 22 provides torque to the air conditioning compressor 144 for operation. The air conditioning compressor 144 may be selectively coupled and decoupled to the engine 22, so that when coupled to the engine 22, the A/C compressor is on, and when decoupled to the engine 22 the A/C compressor is off. The A/C compressor may be coupled to the engine by one or more of a clutch, electronic switch, etc.

Alternator 42 may include a rotor 43, mechanically coupled to the engine 22, and a stator 47 electrically coupled to the second battery 46, first battery 51, and electrical loads 48. Thus, when engine 22 is on, the rotational energy generated by the engine causes the rotor 43 to spin because the rotor 43 is mechanically coupled to the engine 22. In a preferred embodiment, the rotor 43 may include a rotor field coil 45. When the engine 22 is on, and the rotor 43 is spinning relative to the stator 47, current applied to the field coil 45 may induce current to flow in the stator 47. In other embodiments, the field coil 45 may be included in stator 47, and not the rotor 43. Thus, the output current may be induced in the spinning rotor 43, instead of the stationary stator 47. However, in the preferred embodiment, when a voltage is applied to the field coil 45, and the engine 22 is running, a current may be generated in the stator 47. During engine operation, a portion or all of the current output by the stator 47 may flow to field coil 45. As such, the alternator 42 may be self-energizing. Once the engine 22 is on, and the rotor 43 is spinning, current generated by the alternator 42 may be used to supply the voltage and/or current necessary to energize the field coil 45, and in turn continue to produce electrical power from the alternator 42.

However, before the rotor 43 begins to spin, such as when the engine 22 is turned on at a start and/or restart, current to the field coil 45 may be supplied by an external source, outside of the alternator 42. In one example, when the rotor 43 is not spinning such as during an engine start and/or restart, current to the field coil 45 may be supplied by first battery 51. However, in another example, current to the field coil 45 may be supplied by second battery 46 at an engine start and/or restart condition. In other examples, current to the field coil 45 may be supplied by both first battery 51 and second battery 46 at an engine start and/or restart condition. In still further examples, the alternator 42 may include its own DC generator (shown below with reference to FIG. 2) for supplying current to the field coil 45 at an engine start and/or restart condition.

During both an engine start and/or restart, and when the engine is running, the voltage and/or current provided to the field coil 45 may be controlled by a first voltage regulator 44. Thus, any current and/or voltage being supplied to the field coil 45, is regulated and/or adjusted by the voltage regulator 44. The voltage regulator 44 may be a DC/DC converter (or DC/DC converter based device) for example, configured to output a regulated voltage to the field coil 45. In one example the voltage regulator 44 may be included within the alternator 42. However as shown in the example of FIG. 1, the voltage regulator 44 may be external to the alternator 42. Thus, the voltage and/or current provided to the field coil 45, and therefore the current output by the stator 47 may be regulated by the voltage regulator 44. Specifically, voltage regulator 44 may be configured to regulate the voltage and/or current that is supplied to the field coil 45 to a set point, where the set point is adjustable based on electrical signals from the controller 40 and engine operating conditions.

Controller 40, may be in electrical communication with one or more of the first battery 51, second battery 46, electrical loads 48, and voltage regulator 44. The dashed lines in FIG. 1, represent electrical connections between the controller 40 and various components of vehicle system 10. Controller 40 may send signals to the voltage regulator 44, to adjust the set point (e.g., current and/or voltage supplied to the field coil 45) based on the electrical power demands of the vehicle system 10, which may include on one or more of the charge states of the batteries 51 and 46, and operational states of the electrical loads 48. As will be explained in greater detail below with reference to FIG. 2, the voltage regulator 44 and/or the controller 40, may be in electrical communication with the first battery 51, and second battery 46, for sensing the respective voltage of the batteries, and adjusting the current and/or voltage supplied to the field coil 45, based on the charge states of the batteries.

However, in other examples, the controller 40 may additionally or alternatively send signals to the voltage regulator 44, to adjust the set point (e.g., current and/or voltage supplied to the field coil 45) based on engine operating conditions as will be explained in greater detail below with reference to FIGS. 3-5. Engine operating conditions, as will be discussed in greater detail below with reference to FIG. 3, may include a desired engine torque as input via an input device 192 by a vehicle operator 190, an estimated torque produced by the engine, a spark timing, throttle valve position, fuel injection amount, etc. The desired engine torque may be estimated by the controller 40 based on input from the vehicle operator 190 via the input device. Thus, the desired engine torque may be based on the position of the accelerator pedal and brake pedal of input device 192. As will be described below, the fuel injection amount and throttle valve position may be adjusted based on changes in the position of one or more of the accelerator pedal and brake pedal.

Thus, the controller 40 may additionally or alternatively adjust the current and/or voltage supplied to the field coil 45 via the voltage regulator 44 in response to changes in the desired engine torque. For example, as elaborated in greater detail with reference to FIG. 3, the current and/or voltage applied to the field coil 45, and therefore the alternator torque may be increased in response to decreasing desired engine torque. Further, the alternator torque may be adjusted based on a difference between the desired engine torque and the estimated actual engine torque. The estimated actual engine torque may be estimated by the controller 40 based on feedback from a plurality of sensors 65 which may include one or more of a torque sensor, manifold air flow (MAF) sensor, throttle position sensor, crankshaft position sensor, vehicle speed sensor, etc. Thus, the actual engine torque delivered by engine 22, may be estimated based on the intake mass air flow as estimated based on the outputs from a MAF sensor and throttle position sensor, fuel injection amount, crankshaft position, vehicle speed, etc.

Therefore, the controller 40 may determine a desired current and/or voltage to be supplied to the field coil 45, while the voltage regulator 44 may ensure that the actual voltage and or current supplied to the field coil 45, matches the desired voltage and/or current determined by the controller 40. In one example, a voltage command from a controller 40 may be compared to a voltage output by the alternator 42. As an example, if the voltage commanded from the controller 40 is greater than the voltage output by the alternator 42, the voltage and/or current applied to the field coil 45 may be increased, to increase the current output by the stator 47.

When current is generated in the stator 47, an electromotive force is exerted on the rotor 43 by the stator 47, which opposes the rotational motion of the rotor 43. Specifically, the current generated in the field coil 45 of the rotor 43, produces a changing magnetic field, which induces a current to flow in the stator 47. The current generated in the stator 47, produces a magnetic field which exerts a force on the rotor 43 that opposes the rotation of the rotor 43. Said another way, increasing the current and/or voltage supplied to the field coil 45, results in a braking force, which may reduce the speed of the rotor 43. Thus, increasing the current and/or voltage supplied to the field coil 45 may result in a greater force required to rotate the rotor 43 of the alternator 42. As such, when a voltage is applied to the alternator field coil 45, a load is applied on the engine 22. In one example, decreasing the voltage and/or current applied to the field coil 45 may decrease the current output by the alternator 42 and decrease the load applied to the engine 22. Thus, the load applied to the engine 22 may be adjusted by increasing or decreasing the voltage and/or current applied to the field coil 45 of the alternator 42. As will be discussed in greater detail below with reference to FIGS. 3-5, the torque of the engine 22 may be reduced by increasing the voltage and/or current supplied to the field coil 45. Similarly, the torque of the engine 22 may be increased by decreasing the voltage and/or current supplied to the field coil 45.

In this way, the torque output by engine 22 may be adjusted by adjusting the alternator torque. Specifically, the engine torque may be adjusted by adjusting an amount of current and or/voltage supplied to the field coil 45. As explained above, adjusting the current and/or voltage supplied to the field coil 45, may be performed by adjusting the set point of the voltage regulator 44, which may be controlled by controller 40. Thus, controller 40 may adjust the set point of the voltage regulator 44 by sending electrical signals to the voltage regulator 44, and thereby adjust the alternator torque exerted on engine 22, which may in turn result in changes to the torque produced by engine 22. As will be explained in greater detail below with reference to FIG. 3, the controller 40 may adjust the set point of the voltage regulator based on changes in the desired engine torque. The desired engine torque may be an engine torque requested by the vehicle operator 190 via the input device 192, which may include an accelerator pedal and a brake pedal. Therefore, in much the same way, an amount of fuel injected to engine 22 may be adjusted based on vehicle operator input via input device 192, so too may the current and/or voltage supplied to the alternator be adjusted. As such, the alternator torque, (e.g., the torque exerted on the engine by the alternator), may be adjusted based on a desired engine torque as determined based on input from a vehicle operator 190. Specifically, the alternator torque (e.g., the current and/or voltage supplied to the field coil 45) may be increased in response to the vehicle operator 190 demanded engine torque decreasing below an actual torque generated by the engine 22. Thus, in response to changes in the demanded engine torque, the alternator torque may be adjusted to match the actual delivered engine torque to the demanded engine torque. Adjustments to the alternator torque may result in changes in the electrical energy output from the alternator 42.

The electrical energy output from alternator 42, may be directed to one or more of the first battery 51, second battery 46, and the electrical loads 48. Thus, the alternator may be used to recharge batteries 51 and 46, and power various ancillary electrical loads 48 of the vehicle system 10. The first battery 51 and/or second battery 46 may be charged by alternator 42 only during certain engine operating conditions such as during DFSO as described in greater detail below with reference to FIG. 2. As such, current produced by the alternator 42 may be divided between one or more of: the first battery 51, second battery 46, and the electrical loads 48, based on their respective voltages. As an example, if the second battery 46 is at a lower charge state (e.g., lower voltage) than the first battery 51, then a greater portion of the electrical energy produced by the alternator 42 may flow to the second battery 46 than the first battery 51. In other engine operating conditions, alternator 42, may only recharge second battery 46 and not first battery 51. In still further examples, the alternator 42 may only recharge first battery 51, and not second battery 46. In still further examples, current produced by the alternator may only flow to power the electrical loads 48, and not the first battery 51 or second battery 46. However, in other examples, the current produced by the alternator may be flowed to power the electrical loads 48, and one or more of the first battery 51 and second battery 46.

Additionally, as will be described in greater detail below with reference to FIG. 2, first battery 51 and second battery 46 may be electrically coupled to the electrical loads 48 to provide power to said electrical loads 48. Further as described above, first battery 51, may be electrically coupled to the starting system 24, for providing power to start the vehicle system 10. First battery 51 and/or second battery 46 may provide electrical energy to the electrical loads 48 when the current and/or voltage produced by the alternator 42 is insufficient to meet the electrical power demands of the electrical loads 48. Thus, during certain engine operating conditions when the power demands from the electrical loads 48 exceed the power output by the alternator 42, such as during engine idle, first battery 51 and/or second battery 46 may provide all or a portion of the demanded power to the electrical loads 48. As such, the electrical loads 48 may receive power from one or more of the alternator 42, first battery 51, and second battery 46. In one example, as depicted, engine 22 may be configured to be selectively (and automatically) shut down when idle-stop conditions are met and restarted when restart conditions are met. One or more auxiliary loads 48 may be maintained, for example, at 12V, even when the engine is off. The power to maintain the auxiliary loads operational when the engine is shut down may be provided, at least in part, by one or more of second battery 46 and first battery 51.

In this way, first battery 51, and second battery 46 are capable of storing electrical energy produced by the alternator 42, and returning that energy to the vehicle system 10, when the electrical power produced by the alternator 42 is insufficient to meet the electrical demands of the vehicle system 10. As a result, the operational range of current and/or voltages of the alternator 42 may be increased, due to the increased electric storage capacity of the vehicle system 10. Said another way, by including both the first battery 51 and the second battery 46, the electric energy storage capacity of the vehicle system 10 may be increased, so that the current and/or voltage produced by the alternator 42 may fluctuate more without resulting in power losses and/or surges to the electrical loads 48. At higher electric power outputs by the alternator 42, where the power output may exceed the power demand of the electrical loads 48, the first battery 51 and second battery 46 can accept a greater amount of electric power, thereby reducing power surges in the vehicle system. Similarly, at lower electric power outputs by the alternator 42, where the power output by the alternator 42 may be less than the power demand of the electrical loads 48, the first battery 51 and second battery 46 may provide a greater amount of electric power, thereby reducing electric power losses to components of the vehicle system 10. Thus, greater fluctuations in the alternator current and/or voltage output may be tolerated by the vehicle system 10 without decreasing the performance of the electrical loads 48 of the vehicle system 10.

Because the alternator 42 may be allowed to produce a greater range of voltages and/or currents, the alternator torque, and therefore the amount of force capable of being exerted on the engine 22 by the alternator 42 may be increased. As such, the braking force applied to the engine 22 by the alternator 42 may be increased. As will be explained in greater detail below with reference to FIGS. 3-5, the alternator torque may therefore be adjusted to provide improved control of engine torque, while also increasing the fuel efficiency of vehicle system 10.

Vehicle system 10 may be controlled at least partially by controller 40 and by input from the vehicle operator 190 via the input device 192. In the example shown in FIG. 1, input device 192 includes an accelerator pedal and a brake pedal. Additionally, a pedal position sensor 194 is included in the input device 192 for generating a proportional pedal position signal PP. The accelerator pedal and brake pedal may be adjusted between respective first and second positions and any positions therebetween. With increasing deflection from the first position to the second position of the accelerator pedal, the controller 40 may command one or more of the following: an increase in the fuel injection amount, increase in intake mass air flow, and decrease in current and/or voltage applied to the field coil 45 of alternator 42. As described above, the controller 40 may adjust the fuel injection amount via the fuel injector 26, and may adjust intake mass air flow by adjusting the position of the throttle valve 25. Conversely, with increasing deflection from the first position to the second position of the brake pedal, the controller 40 may command one or more of the following: an increase in the voltage and/or current supplied to the alternator field coil 45, decrease in fuel injection amount, and decrease in intake mass air flow.

Controller 40 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 40 may be configured to receive information from a plurality of sensors 65 and to send control signals to a plurality of actuators 75 (various examples of which are described herein). For example, as explained above, the controller 40 may send a signal to an actuator of the throttle valve 25, to adjust the position of the throttle valve 25 in response to information received from an input device 192. Other actuators such as a variety of additional valves and throttles, may be coupled to various locations in the vehicle system 10. Controller 40 may receive input data from the various sensors, process the input data, and trigger the actuators in response to the processed input data based on instruction or code programmed therein corresponding to one or more routines. Example control routines are described herein with regard to FIG. 3.

In some examples, the alternator load can be varied based on control parameters that are not strictly dependent on engine speed and/or torque. For example, alternator field voltage and/or current can be adjusted to compensate for engine friction that is related to engine temperature. Alternatively, the controller 40 can provide a predictable consistent amount of mechanical load on the engine by substantially maintaining a constant voltage to the alternator field coil circuit. However, it should be noted that field current and load provided by the alternator to the engine are not constant when a constant voltage is applied to the alternator field. Rather, when a constant voltage is applied to the alternator field coil the alternator field current changes with the angular velocity of the rotor. Thus, the current output by the stator 47, depends on both the voltage and/or current applied to the field coil 45 and the speed of the engine 22. The load applied to the engine 22 by the alternator 42 depends on the voltage and/or current applied to the field coil 45.

Controller 40 may also adjust an engine torque output by adjusting a combination of spark timing (also referred to herein as ignition timing), fuel pulse width, fuel pulse timing, and/or air charge, by controlling throttle opening and/or valve timing, valve lift and boost for turbo- or super-charged engines. In the case of a diesel engine, controller 40 may control the engine torque output by controlling a combination of fuel pulse width, fuel pulse timing, and air charge. In all cases, engine control may be performed on a cylinder-by-cylinder basis to control the engine torque output. Further, controller 40 may use engine torque actuators (e.g., throttle valve 25 and fuel injector 26) along with making adjustments to current supplied to an alternator field coil 45 to control engine speed and/or torque during engine operation. By controlling engine torque actuators and the load applied to the engine 22 via the alternator 42 it may be possible to control the torque of the engine 22 to within a desired range during engine operation.

In this way, a vehicle system may comprise an alternator mechanically coupled to an engine, whereby the alternator is configured to convert a portion of the mechanical energy produced by the engine into electric energy. Specifically, a voltage and/or current supplied to a field coil in a rotor of the alternator may be adjusted to adjust the electric output of the alternator. As the rotor spins due to rotational energy produced by the engine, the current in the field coil produces an alternating magnetic field, which in turn induces a current to be generated in a stator of the alternator. The current generated in the stator produces a magnetic field which exerts a force on the rotor that opposes the rotation of the rotor. Therefore, a torque is exerted on the engine by the alternator. As the voltage and/or current supplied to the field coil increases, the alternator torque increases, and therefore the braking force applied to the engine by the alternator increases.

The vehicle system may further comprise two batteries for storing electric energy produced by the alternator, and for providing energy to ancillary electric devices of the vehicle system. The dual battery system may provide increased electric storage capacity for the vehicle system. Because of the increased power output by the dual battery system, lower alternator torques may be achieved without sacrificing power supply to the electrical devices. Further, since the dual battery system is capable of storing an increased amount of electric power from the alternator, higher alternator torques may be achieved while reducing power surges that may result in degradation of an electrical system of the vehicle. As a result, the current and/or voltage applied to the field coil, and therefore the alternator torque may be varied to a greater degree without sacrificing the function of electric devices in the vehicle system.

Since the alternator torque may be adjusted between a wider range of torques, the braking force exerted on the engine by the alternator may be increased. Because the maximum braking force provided by the alternator on the engine may be increased, alternator torque may be used to reduce engine torque at higher engine torques. As a result, other methods for decreasing engine torque, such as the usage of spark retard may be reduced, and the fuel efficiency of the vehicle system may be improved.

Turning to FIG. 2, a block diagram layout of an example electrical system of vehicle system 10 from FIG. 1 is shown. Components of the vehicle system 10 shown in FIG. 2 may be the same as the components shown in FIG. 1. Thus, the components of the vehicle system 10 described above with reference to FIG. 1 may not be described in detail again below. All connecting lines shown in FIG. 2 represent electrical connections. As such, any components of vehicle system 10 shown coupled to one another may be directly electrically connected to one another.

Controller 40 may be configured to receive information from a plurality of sensors 65 and to send control signals to a plurality of actuators 75 (various examples of which are described herein). For example, the controller 40 may estimate the engine torque produced by the engine (e.g., engine 22 shown in FIG. 1) from a plurality of sensors such as an MAF sensor, throttle position sensor, crankshaft position sensor, torque sensor, vehicle speed sensor, etc. Based on the information received from the plurality of sensors 65, and from input via a vehicle operator (e.g., vehicle operator 192 shown in FIG. 1), the controller 40 send control signals to one or more of a throttle valve (e.g., throttle valve 25 shown in FIG. 1), fuel injector (e.g., fuel injector 26 shown in FIG. 1), and the voltage regulator 44 for adjusting the torque output by the engine (e.g., engine 22 shown in FIG. 1).

The controller 40 may be in electric communication with the first battery 51, second battery 46, electrical loads 48, voltage regulator 44, an ignition switch 210, and a control circuit 212. The electrical loads 48 may include ancillary electrical devices such as pumps, heaters, fans, radio, power steering, etc. In some examples, the controller may be powered by one or more of the first battery 51 and second battery 46. In still further examples, the controller 40 may have its own power source. The voltage regulator 44 may be electrically coupled to the field coil 45 of alternator 42, and one or more of the first battery 51 and second battery 46 for sensing voltages output by the first and second batteries, respectively, and relaying the sensed voltages to the controller 40. However, in other examples the controller 40 may be directly coupled to the first battery 51 and second battery 46, for sensing the voltages of the respective batteries. Controller 40 may send signals to the voltage regulator 44 to adjust the voltage and/or current to the alternator field coil 45 based on the sensed voltages of the first battery 51 and second battery 46, and on the power demands of the electrical loads 48. In still further examples, as explained above with reference to FIG. 1, the controller 40 may adjust the voltage and/or current supplied to the alternator field coil 45 based on a desired engine torque and an estimated engine torque.

When an engine is not spinning (e.g., engine 22 shown in FIG. 1) current and/or voltage may be supplied to the field coil 45 by one or more of the first battery 51 and second battery 46. Specifically an ignition switch 210 may be provided in an electric path between the second battery 46 and the voltage regulator 44, and/or between the first battery 51. The ignition switch may be adjusted between a first position (shown by the dotted line 211 in FIG. 2), in which electric current flows from the second battery 46 to the voltage regulator 44, and a second position (shown by the solid line 213 in FIG. 2), in which electric current does not flow from the second battery 46 to the voltage regulator 44. When the engine is not spinning, the controller 40 may signal to an actuator of the ignition switch 210 to adjust the position of the ignition switch 210 to the first position 211. However, once the engine is running, the voltage and/or current supplied to the field coil may be produced by the stator 47. Thus as described above with reference to FIG. 1, the alternator 42 may be self-energizing once the engine is on and is producing rotational energy. However, in other examples, the alternator 42 may include its own exciter circuit 202 which may supply the voltage to the field coil 45, when the engine is not spinning. The exciter circuit 202 may be a DC generator or other DC current power source.

When a voltage and/or current is applied to the alternator field coil 45, an alternating magnetic field may be produced by the field coil 45, which may induce current to flow in the stator 47. The stator 47 may comprise coil windings, configured to output current to power the electrical loads 48, and charge one or more of the first battery 51 and second battery 46. During engine operation, the voltage and/or current to the alternator field coil 45 may be modulated by commands from the controller 40 to the voltage regulator 44 depending on the current demands of the electrical system of vehicle system 10 which may comprise one or more of the first battery 51, second battery 46, and electrical loads 48. As an example, if the controller 40 determines that the current and/or voltage output by the alternator 42 exceeds the current and/or voltage draw from the first battery 51, second battery 46 and electrical loads 48, then the controller may signal to the voltage regulator 44 to reduce the voltage and/or current to the field coil 45. In another example, if the controller 40 determines that the current output by the alternator 42 is less than the currents demands of the electrical loads 48, the controller may signal to the voltage regulator to increase the voltage and/or current to the field coil 45.

Said another way, the voltage regulator 44, may vary a current applied to the field coil 45 to produce a constant voltage in the current output by the alternator 42. In some examples, the first battery 51 and/or second battery 46 may also be used to supplement electrical power output from the alternator 42, if the current demand from the electrical loads 48 is greater than the current output by the alternator 42. Said another way, the first battery 51 and/or second battery 46 may supply additional electrical power to the electrical loads 48 if the current demand from the electrical loads 48 exceeds the current output by the alternator 42. Thus, in some examples, the controller 40 may sense the voltage (e.g., charge state) of the first battery 51 and second battery 46, and control the current and/or voltage applied to the field coil 45 to achieve a constant state of charge on the first and second batteries 51 and 46, respectively.

During engine operating conditions when the engine torque decreases below a threshold such as during engine idle, engine stop, and/or DFSO, a voltage sufficient to power all of the electrical loads 48 of the vehicle system 10 may continue to be applied to the field coil 45. In other examples, at engine idle, a voltage sufficient to power all of the electrical loads 48 and charge one or more of the first battery 51 and the second battery 46 of the vehicle system 10 may be applied to the field coil 45. In still further examples, at engine idle, a voltage sufficient to charge one or more of the first battery 51 and second battery 46 but not all of the electrical loads 48 of the vehicle system 10 may be applied to the field coil 45. In other examples, the current applied to the field coil 45 may drop to approximately zero when engine torque decreases below the threshold, and one or more of the first battery 51 and second battery 46 may be used to supply all of the electrical power needs of the electrical loads 48.

Thus, controller 40 may receive signals relating to the charge state of the first battery 51, second battery 46, power demands from the electrical loads 48, and current output from the stator 47 of alternator 42. Additionally, the controller 40 may estimate and/or measure engine operating conditions based on feedback from a plurality of sensors 65 as described above. In this way, controller 40 may adjust the voltage and/or current to the alternator field coil 45, and thereby the current output by the alternator 42, based on engine operating conditions, power demands from the electrical loads 48 and the charge state of first battery 51 and second battery 46.

As described above, current and/or voltage generated by alternator 42, may directed to one or more of first battery 51 and second battery 46 based on the voltages of the batteries. However, current flow from the alternator 42 to the first battery 51, may additionally be regulated by the control circuit 212. Specifically, the control circuit 212 may comprise a diode 214, and a diode bypass 216. The diode 214 may be configured to provide unidirectional current flow in the vehicle system 10. The diode 214 is depicted in the example of FIG. 2 as an arrow, where the direction of current flow through the diode 214 is in the direction that the arrow points. Thus, current may only flow through the diode 214 from the first battery 51 to the electrical loads 48. As such, current may not flow from the alternator 42 to the first battery 51 through the diode 214. However, current may flow around the diode 214 through the diode bypass 216, when the bypass is adjusted to a first position, shown in FIG. 2 as the dotted line 217. The position of bypass 216 may be controlled by controller 40. Thus, controller 40 may send signals to an actuator of bypass 216 for adjusting the position of the bypass 216. The position of bypass 216 may be adjusted between the first position in which current may flow from the alternator 42 to the first battery 51, and a second position, in which current may not flow from the alternator 42 to the first battery 51. In this way, when bypass 216 is adjusted to the first position, current may flow bi-directionally between the first battery 51, and one or more of the alternator 42 and the electrical loads 48. However, when bypass 216 is adjusted to the second position, current may only flow from the first battery 51 to one or more of the alternator 42 and the electrical loads 48, and not from one or more of the second battery 46 and the alternator 42 to the first battery 51.

The controller 40 may send signals to the bypass 216 to adjust the position of the bypass 216 based on engine operating conditions such as the engine torque, engine speed, engine operational status, etc. For example, if the desired engine speed and/or torque of the engine decreases based on input from the vehicle operator by more than a threshold, such as during DFSO, fuel injection may be turned off, intake mass air flow may be decreased, and alternator torque may be increased. In response to the, increased alternator torque, and therefore increased electric power output by alternator 42, bypass 216 may be adjusted to the first position so that all or a portion of the electric power generated by the alternator 42 may be directed to the first battery 51 for charging the battery. In other examples, the controller may adjust the position of the bypass 216 additionally based on the sensed voltage of the first battery 51. For example, if the vehicle system 10 enters a DFSO condition, the controller may not adjust the bypass 216 to the first position, and may not flow electric power from the alternator 42 to the first battery 51, if the sensed voltage of the battery 51 is greater than a threshold. Thus, the controller may adjust the bypass 216 based on both engine operating conditions and the charge state of the first battery 51. If the battery 51 is sufficiently charged, the controller may restrict current flow from the alternator 42 to the first battery 51.

In another example, the controller 40 may adjust the position of the bypass 216 to the first position at engine idle, and/or a vehicle stop. Thus, when the engine is in idle, the power generated by the alternator 42 may be insufficient to meet the demands of the electrical loads 48. Therefore, the controller 40 may adjust the position of the bypass 216 to the first position so that the first battery 51 may provide voltage and/or current to the electrical loads 48.

The controller may adjust the position of the bypass 216 to the second position at an engine start and/or restart when the engine is not running. As such, since current may not flow from the second battery 46 to either the first battery 51 or the starting system 24, and all of the electric energy output by the second battery 46 may be directed to the electrical loads 48. Further, first battery 51 may provide power to the starting system 24.

In this way, the controller may regulate the current and/or voltage supplied to the field coil 45, based on the electric power demands of the vehicle system 10, and on engine operating conditions. Thus, the alternator torque may be adjusted to meet the electric power demands of the vehicle system 10, and to control the engine torque to a desired engine torque as estimated by the controller 40.

Figure 3:
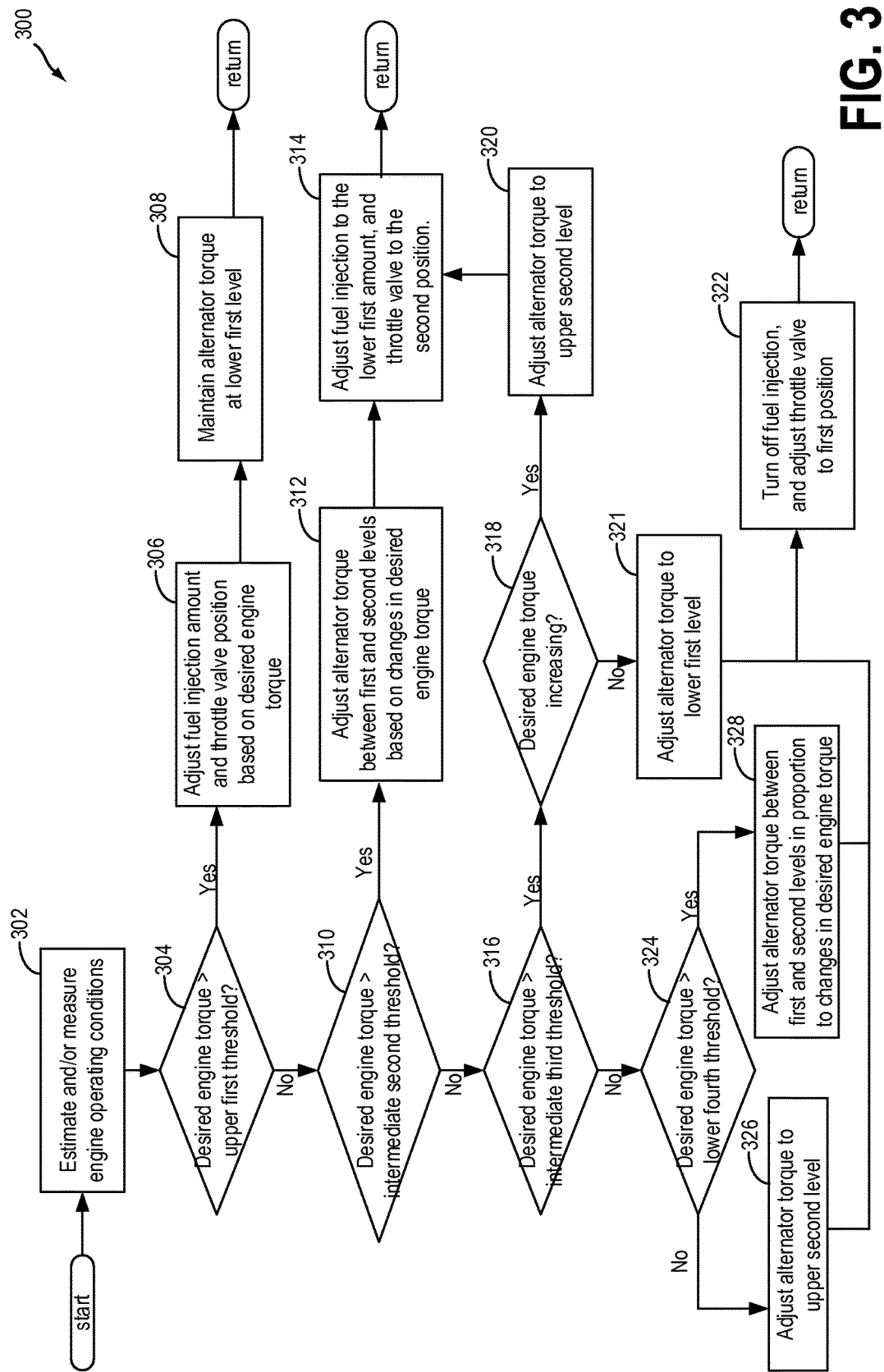
FIG. 3 shows a flow chart of a method for regulating engine torque.

FIG. 3 shows a flow chart of a method 300 for adjusting an engine torque in response to changes in engine operating conditions. Instructions for carrying out method 300 may be stored in a memory of an engine controller such as controller 40 shown in FIGS. 1-2. Further, method 300 may be executed by the controller. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 300 begins at 302 and the controller (e.g., controller 40) estimates and/or measures engine operating conditions based on feedback from a plurality of sensors (e.g., sensors 65). Engine operating conditions may include, engine speed, engine load, engine torque, engine load, intake mass air flow, manifold pressure, a position of a throttle valve, a position of a brake pedal, a position of an accelerator pedal, etc.

After estimating and/or measuring engine operating conditions the method 300 proceeds to 304 and includes determining if a desired engine torque is greater than an upper first threshold. As described above with reference to FIG. 1, the desired engine torque may be an engine torque requested by a vehicle operator (e.g., vehicle operator 190 shown in FIG. 1) via an input device (e.g., input device 192). For example the input device may include an accelerator pedal and a brake pedal. Thus, the desired engine torque may be based on the position of the accelerator pedal and brake pedal of input device. Both the accelerator pedal and brake pedal may be adjusted between respective first and second positions. The desired engine torque may increase with increasing deflection of the accelerator pedal from the first position to the second position and increasing deflection of the brake pedal from the second position to the first position. The first position may represent a position in which the respective pedal is not depressed by the vehicle operator, and the second position may represent a position of the pedal where the pedal is fully depressed by the vehicle operator. As the vehicle operator depresses the accelerator pedal, the desired engine torque may increase. Similarly as the vehicle operator depressed the brake pedal, the desired engine torque may decrease. The positions of the brake pedal and accelerator pedal may be measured by a pedal position sensor (e.g., pedal position sensor 194 shown in FIG. 1), which may be relayed to the controller. Thus, based on the positions of the brake and accelerator pedals of the input device 192, the controller may determine the desired engine torque. Specifically, the controller may determine the desired engine torque based on a look-up table stored in computer readable memory relating the position of the input device 192 to desired engine torques.

The upper first threshold may represent approximately a zero-threshold torque level. Thus, the upper first threshold may be approximately zero. As such, engine torque above the first threshold may be positive engine torque, where the engine speed may be increasing. On the other hand, engine torques below the first threshold may be negative engine torques where the engine speed may be decreasing.

If it is determined at 304 that the desired engine torque is greater than the upper first threshold, then method 300 may proceed to 306 which comprises adjusting a fuel injection amount and throttle valve position based on the desired engine torque. Specifically, the method at 306 comprises adjusting an amount of fuel injected into an engine (e.g., engine 22 shown in FIG. 1), between a lower first amount and a higher second amount based on changes in the desired engine torque, where the second amount is greater than the first amount. As such the controller may send signals to one or more fuel injectors (e.g., fuel injector 26 shown in FIG. 1), to monotonically increase the amount of fuel injected to the engine for increases in the desired engine torque. Thus, the fuel injection amount may be proportionate to the desired engine torque, with fuel injection increasing with increasing desired engine torque, and decreasing with decreasing desired engine torque. However, in some examples, the fuel injection amount may not exceed the second amount. Similarly the position of the throttle valve (e.g., throttle valve 25 shown in FIG. 1) may be adjusted between a second position and a third position based on changes in the desired engine torque at 306. The amount of intake air flowing to the engine may increase with increasing deflection from the second position to the third position. Thus, when the throttle valve is in the third position, more air may flow to the engine than when the throttle valve is in the second position.

The controller may send signals to an actuator of the throttle valve to adjust the position of the throttle valve based on the desired engine torque, and a relationship between fuel injection amount and throttle position which may be stored in a look-up table stored in the memory of the controller. The relationship between the fuel injection amount and throttle position may be based on a desired air/fuel ratio. Thus, based on the desired engine torque, the controller may determine a desired air flow and fuel injection amount based on a desired air/fuel ratio. In some examples the air/fuel ratio may be stoichiometric and may be approximately 14.7:1. However in other examples the air/fuel ratio may be greater and/or less than stoichiometric. Therefore, based on the desired an engine torque, and a desired air/fuel ratio, the controller may send signals to the throttle valve actuator to adjust the position of the throttle valve, and to the fuel injector to adjust an amount of fuel to be injected to the engine, so that the desired engine torque and air/fuel ratio may be maintained. For increases in engine torque above the upper first threshold, the position of the throttle valve may be adjusted with increasing deflection from the second position towards the third position, and the fuel injection amount may be increased according to the desired air/fuel ratio. Similarly, for decreases in engine torque above the upper first threshold, the position of the throttle valve may be adjusted with increasing deflection from the third position towards the second position, and the fuel injection amount may be decreased according to the desired air/fuel ratio.

Method 300 may then continue from 306 to 308 which comprises maintaining alternator torque to a lower first level. As discussed above with reference to FIG. 1, a rotor (e.g., rotor 43) of an alternator (e.g., alternator 42) may be mechanically coupled to the engine. The controller may adjust the alternator torque by adjusting the voltage supplied to an alternator field coil (e.g., alternator field coil 45). In one example, the controller may adjust the set point of a voltage regulator (e.g., voltage regulator 44) at 411. Adjusting the set point of the voltage regulator may adjust the voltage and/or current supplied to the field coil of the alternator. Since adjusting the current and/or voltage supplied to the field coil results in adjustments to the load exerted on the engine by the alternator, adjusting of the current and/or voltage supplied to the field coil may also be referred to as adjusting the alternator torque. Thus, increasing the alternator torque may be used to describe increasing the voltage and/or current supplied to the field coil. In this way, the method 300 at 308 may include adjusting the voltage and/or current supplied to the field coil to a lower first level. The lower first level of the voltage and/or current supplied to the field coil may be a voltage and/or current sufficient to generate a resulting power output of the alternator that may provide all or a portion of the power needed to run various ancillary electrical devices (e.g., electrical devices 48 shown in FIGS. 1-2). Additionally or alternatively, the lower first level may be a voltage and/or current sufficient to provide electric power to one or more batteries (e.g., first battery 51 and second battery 46 shown in FIGS. 1-2).

It is important to note that method 300 may proceed to 308 before executing 306. In other examples, method 300 may execute 306 and 308 simultaneously. After executing both 306 and 308, method 300 then returns.

Returning to 304, if it is determined at 304, that the engine torque is not greater that the upper first threshold (e.g., is less than the first threshold), then method 300 continues to 310 which comprises determining if the desired engine torque is greater than an intermediate second threshold. The intermediate second threshold is less than the upper first threshold. The second threshold may an engine torque level stored in the memory of the controller. If it is determined at 310 that the engine torque is above the second threshold, then method 300 may continue to 312 which comprises adjusting the alternator torque between the lower first level and an upper second level based on changes in the desired engine torque between the first and second thresholds. The upper second level may be an alternator torque level at which, the current and/or voltage generated by the alternator is sufficient to power various electrical devices (e.g., electrical loads 48 shown in FIGS. 1-2) and recharge one or more of a first battery (e.g., first battery 51 shown in FIGS. 1-2) and a second battery (e.g., second battery 46 shown in FIGS. 1-2). The alternator torque may be adjusted in inverse proportion to changes in the engine torque. Thus, as the desired engine torque increases between the first and second threshold, the alternator torque may decrease, and as the engine torque decreases, the alternator torque may increase. Said another way, the alternator torque monotonically decrease with increasing engine torque, and vice versa.

In another example, the alternator torque may additionally or alternatively be adjusted based on a difference between the desired engine torque and an estimated actual engine torque. As explained above with reference to FIG. 1, the estimated actual engine torque, may be an estimate of the current torque output by the engine. The engine torque may be estimated by the controller based on feedback from one or more sensors (e.g., sensor 65 shown in FIG. 1) such as a torque sensor, manifold air flow (MAF) sensor, throttle position sensor, crankshaft position sensor, vehicle speed sensor, etc. Thus, the actual engine torque delivered by the engine, may be estimated based on the intake mass air flow as estimated based on the outputs from a MAF sensor and throttle position sensor, fuel injection amount, crankshaft position, vehicle speed, etc. In other examples, the engine torque may be estimated by a torque sensor positioned on a crankshaft of the engine. Thus, the alternator torque may be adjusted based on a difference between the estimated engine torque and the desired engine torque. If the desired engine torque is less than the estimated engine torque, then the voltage and/or current applied to the field coil (e.g., alternator torque) may be increased to provide a braking force to the engine. Thus, increasing the alternator torque may bring about a corresponding decrease in engine torque, which may reduce the disparity between the desired and estimated engine torque. However, if the desired engine torque is greater than the estimated engine torque, then the alternator torque may be decreased, to bring about a corresponding increase in engine torque, and more closely match the estimated engine torque to the desired engine torque.

Thus, the method 300 at 312 comprises adjusting the alternator torque based on changes in the desired engine torque to match the actual engine torque more closely with the desired engine torque. In this way, the current and/or voltage supplied to the field coil may be adjusted to regulate the engine torque. Specifically, the current and/or voltage supplied to the field coil may be monotonically increased to cause a decrease in engine torque in response to decreases in the desired engine torque and/or in conditions where the desired engine torque is less than the estimated engine torque. Similarly, the current and/or voltage supplied to the field coil may be monotonically decreased to cause an increase in engine torque in response to increases in the desired engine torque and/or in condition where the desired engine torque is greater than the estimated engine torque.

In other embodiments, the method 300 at 312 may additionally comprise adjusting the spark timing of the engine. However, the spark timing is only retarded when the alternator torque is at the upper second level, and the desired engine torque is less than the estimated delivered engine torque. Thus, if increasing the alternator torque to the upper second level is insufficient to bring about the required drop in engine torque to match the delivered engine torque to the desired engine torque, then the method 300 at 312 may additionally include retarding the spark timing. Said another way, as the desired engine torque decreases, the alternator torque may be monotonically increased up to the upper second level. If the delivered engine torque is still greater than the desired engine torque with the alternator torque at the upper second level, the spark timing may be retarded to further reduce the desired engine torque. Specifically, the sparking timing may retarded from a set point to a point later in the compression stroke in response to the desired engine torque decreasing and/or the desired engine torque being less than the estimated delivered engine torque. Said another way, the spark timing may be adjusted to a point closer to the top dead center position of one or more pistons in one or more engine cylinders of the engine. Thus, increasing the amount of spark retard means adjusting the spark timing to be closer to the point at which the piston is at the top dead center position in the compression stroke. The amount of time that the spark timing is retarded in the compression stroke may monotonically increase with decreasing desired engine torque. That is to say that, if the alternator torque is at the upper second level, the spark timing may be retarded in proportion to the amount of difference between the desired engine torque and the estimated engine torque. Therefore, when the desired engine torque is between the second and third thresholds, and the alternator torque is at the upper second level, the spark timing may be retarded until the estimated engine torque matches the desired engine torque. Retarding the spark timing may reduce the delivered engine torque, since retarding the spark timing reduces the power produced during a full cylinder stroke. The amount of spark retard may be proportionate to the amount of decrease in the desired engine torque and/or amount of difference between the desired engine torque and the estimated engine torque. Thus, the spark retard may be monotonically increased up to an upper first level for decreases in the desired engine torque. Said another way, the spark timing may be retarded up to a first level, where the amount of spark retard may be proportional to the amount of decrease in the desired engine torque.

In still further embodiments, the method 300 at 312 may additionally or alternatively comprise supplying power to an A/C compressor (e.g., A/C/compressor 144 shown in FIG. 1), for providing an additional load on the engine. Thus, the method 300 at 312 may additionally or alternatively include coupling the A/C compressor to the engine so that the engine supplies power to the A/C compressor for cooling a coolant of the engine. By coupling the A/C compressor to the engine, at 312, a coolant of the engine may be cooled by the A/C compressor, to reduce the amount of time the A/C compressor is on. Thus, by coupling the A/C compressor to the engine when the estimated engine torque is greater than desired, the use of the A/C compressor at conditions when the estimated engine torque is not greater than desired may be reduced, and therefore fuel efficiency may be improved.

Method 300 may then proceed from 312 to 314, which comprises adjusting the fuel injection to the lower first amount, and adjusting the throttle valve to the second position. If the fuel injection amount is already at the lower first amount at 314, then the method 300 at 314 may comprise maintaining the fuel injection amount at the lower first amount. Similarly, if the throttle valve is already in the second position at 314, then the method 300 at 314 may comprise maintaining the position of the throttle valve in the second position. If the fuel injection is off at 314, and fuel is not being injected to the engine at 314, then the method 300 at 314 may comprise initiating engine combustion, and increasing the fuel injection amount to the lower first amount. As such, when the desired engine torque is between the second threshold and the first threshold, the fuel injection amount and air flow to the engine may be held relatively constant. The fuel injection amount may be maintained approximately constant the lower first amount, and the throttle valve may be maintained at the second position so that an approximately constant amount of intake air may flow to the engine. It is important to note that method 300 may proceed to 314 before executing 312. In other examples, method 300 may execute 312 and 314 simultaneously. After 312 and 314 are executed, method 300 then returns.

Returning to 310, if it is determined that the desired engine torque is not greater than the second threshold (e.g., desired torque is less than the second threshold), then method 300 proceeds to 316 which comprises determining if the desired engine torque is greater than an intermediate third threshold. The intermediate third threshold is less than the intermediate second threshold. However, in some embodiments, the third threshold may be approximately the same as the second threshold, and therefore the difference between the third threshold and second threshold may be nearly zero. Thus, the range of desired engine torque levels between he second and third thresholds is smaller than the range of desired engine torque levels between the first and second thresholds. The third threshold may an engine torque level stored in the memory of the controller. If the desired engine torque is greater than the third threshold at 316, and thus the desired engine torque is between the third and second thresholds, then method 300 continues to 318, which in one example may comprise determining if the desired engine torque is increasing. When the desired engine torque is between the second and third thresholds, the method 300 comprises either stepping up the alternator torque from the lower first level to the upper second level or stepping the alternator torque down from the upper second level to the lower first level. Additionally, when the alternator torque is between the second and third threshold, the method 300 may comprise turning on, or turning of fuel injection. The method 300 at 318 comprises determining whether or not to increase the alternator torque to the upper second level, or decrease the alternator torque to the lower first level. Specifically, in some embodiments, the method 300 at 318 may comprise determining if the alternator torque is at the lower first level or the upper second level. In other examples, the method at 318 may comprise determining if the desired engine torque is increasing or decreasing between the second and third thresholds. However, in still further embodiments, the method at 318 may comprise determining if the desired torque is less than, or greater than the estimated delivered torque.

If the desired torque is increasing, and/or the desired torque is greater than the estimated delivered torque, and/or the alternator torque is at lower first level when the desired torque is between the second and third thresholds, then fuel injection may be turned on, and the alternator torque may be increased to the upper second level which may result in an increase in the delivered toque, so as to match the delivered torque to the desired torque. However, if the desired torque is less than the estimated delivered torque, and/or the desired torque is decreasing, and/or the alternator torque is at the upper second level when the desired torque is between the second and third thresholds, then fuel injection may be turned off, and the alternator torque may be reduced to the lower first level, to bring about a corresponding decrease in the delivered torque, so that the delivered torque may be adjusted to match the desired torque.

Thus, in one example, the method 300 at 318 may comprise determining if the desired engine torque is increasing. Method 300 may be running continuously, such that multiple cycles of method 300 may be executed sequentially. As such, the values of the desired engine torque and/or estimated delivered engine torque over a duration may be stored in the memory of the controller. The duration may include an amount of time, duration of engine use, number of engine cycles, etc. Thus, the controller may store in its memory, a dataset of desired engine torques over a duration. Based on the most recent stored values for the desired engine torque, the method 300 may include determining if the engine torque is increasing or decreasing. In some examples, it may be determined at 318 of method 300 that the desired engine torque is increasing if the current desired engine torque is greater than the most recent stored engine torque value. In other examples, it may be determined that the desired engine torque is increasing if the rate of desired engine torque increase is greater than a threshold. Thus, the method 300 at 318 may include determining if the desired engine torque is increasing or decreasing by comparing the current desired engine torque to the engine torques most recently recorded and stored in the memory of the controller. In this way, the values of the desired engine torque for each iteration of method 300 may be stored over multiple iterations of method 300. If it is determined that the engine torque is increasing at 318, method 300 may continue to 320 which comprises adjusting the alternator torque to the upper second level. However, if it is determined that the engine torque is decreasing at 318, method 300 may continue to 321 which comprises adjusting the alternator torque to the lower first level.

In another embodiment the method 300 at 318 may additionally or alternatively include determining if the desired engine torque is greater than the estimated delivered engine torque in the manner described above at 312 of method 300. Thus, in some examples, the method 300 at 318 may not include determining if the desired engine torque is increasing or decreasing, but instead may only include determining if the desired engine torque is greater or lower than the estimated delivered engine torque. If the desired engine torque is greater than the estimated delivered engine torque at 318, then method 300 may continue to 320 which comprises adjusting the alternator torque to the upper second level. However, if the desired engine torque is less than the estimated delivered engine torque at 318, then method 300 may continue to 321 which comprises adjusting the alternator torque to the lower first level.

In still further embodiments, the method 300 at 318 may additionally or alternatively include determining if the alternator torque is at the first level and/or the second level. The alternator torque level may be determined based on commands sent from the controller to the voltage regulator. Thus, since the current and/or voltage supplied to the field coil is set based on signals sent from the controller to the voltage regulator, the current and/or voltage supplied to the field coil, and therefore the alternator torque may be determined based on the most recent signals sent from the controller to the voltage regulator. If the alternator torque is at the first level, then the method 300 may continue to 320 which comprises adjusting the alternator torque to the upper second level. However, if the alternator torque is at the second level, then method 300 may continue to 321 which comprises adjusting the alternator torque to the lower first level. Thus, method 300 may proceed from 318 to 321 which comprises adjusting the alternator torque to the lower first level, if it is determined at 318 that one or more of the engine torque is decreasing, the desired engine torque is less than the estimated delivered engine torque, and the alternator torque is at the upper second level.

However, method 300 may proceed from 318 to 320 if it is determined at 318 that one or more of the engine torque is increasing, the desired engine torque is greater than the estimated delivered engine torque, and the alternator torque is at the lower first level. Specifically, the method 300 at 320 may comprise stepping the current and/or voltage applied to the alternator field coil from the present current/or voltage, to the current and/or voltage of the upper second level. Thus, in some examples, the method 300 at 320 may comprise stepping up the alternator torque approximately instantaneously to the upper second level. If the alternator torque is already at the upper second level at 320, then the method 300 at 320 may comprise maintaining the alternator torque at the upper second level. The alternator torque may not exceed the upper second level. Thus, the current and/or voltage supplied to the alternator field coil at 320 may not exceed the upper second level at 320. Thus, the upper second level may represent an alternator torque level, above which may result in electric power surges produced by the alternator that could cause degradation of the electrical system of the vehicle. From 320, the method 300 may proceed to 314 which comprises initiating engine combustion. Said another way, the method 300 may proceed to 314 which comprises adjusting fuel injection amount and throttle valve position in the manner previously described at 314 of method 300. Thus, if the alternator torque is increasing between the third and fourth thresholds, the fuel injection may be turned on.

In some examples, initiating engine combustion (e.g., turning on the fuel injection) as the desired engine torque increases between the third and fourth threshold, may result in the delivered engine torque increasing by an amount greater than the increase in the desired engine torque. Thus, after adjusting fuel injection to the lower first amount at 314, the delivered engine torque may be greater than the desired engine torque. In such examples, the method 300 may additionally include retarding the spark timing in the manner described above with reference to 312 of method 300. Thus, the spark retard may be stepped up to an upper first level, and then may be monotonically decreased until the delivered engine torque matches the desired engine torque. However, it is important to note that in other embodiments, 320 and 314 may be executed simultaneously, while in still further embodiments 314 may be executed before 320. After determining that one or more of the engine torque is increasing, the desired engine torque is greater than the estimated delivered engine torque, and the alternator torque is at the lower first level, and executing both 320 and 314, method 300 then returns.

Returning to 318, method 300 may proceed from 318 to 321 if it is determined at 318 that one or more of the engine torque is decreasing, the desired engine torque is less than the estimated delivered engine torque, and the alternator torque is at the upper second level. Specifically, the method 300 at 321 may comprise stepping down the current and/or voltage applied to the alternator field coil from the present current/or voltage, to the lower first level. Thus, in some examples, the method 300 at 321 may comprise stepping down the alternator torque approximately instantaneously to the lower first level. If the alternator torque is already at the lower first level at 321, then the method 300 at 321 may comprise maintaining the alternator torque at the lower first level. From 321, the method 300 may proceed to 322 which comprises turning off fuel injection and adjusting the throttle valve to a first position. Turning off the fuel injection may comprise the controller sending signals to the one or more fuel injectors so that approximately zero fuel is injected to the engine. Thus, fuel is not injected to the engine at 322. Consequently the throttle valve is adjusted to a first position which is a position less proximate to the third position than the second position. As such, less intake air may flow to the engine when the throttle valve is in the first position than the second and/or third positions. In some examples the first position of the throttle valve may permit a threshold amount of air to travel to the engine, where the threshold amount of air represents a minimum amount of air to be admitted to the engine below which may result in engine degradation. However, it is important to note that in other embodiments, 321 and 322 may be executed simultaneously, while in still further embodiments 322 may be executed before 321. After determining that one or more engine torque is decreasing, the desired engine torque is less than the estimated delivered engine torque, and the alternator torque is at the upper second level, and both 321 and 322 have been executed, method 300 then returns.

Returning to 316, if it is determined that the desired engine torque is not greater than the intermediate third threshold (e.g., is less than the third threshold), method 300 proceeds to 324 which comprises determining if the desired engine torque is greater than a lower fourth threshold. The lower fourth threshold is less than the intermediate third threshold. If the desired engine torque is greater than the fourth threshold and is therefore between the fourth and third thresholds, then method 300 may continue to 328 which comprises adjusting the alternator torque between the first and second levels in proportion to changes in the desired engine torque in the manner described above at 312 of method 300. However, unlike at 312, where in some embodiments, the spark timing may be retarded, the spark timing is not retarded at 328. Thus the method 300 at 328 comprises only adjusting alternator torque and not adjusting the spark timing. Method 300 may then proceed from 328 to 322 and turn the fuel injection off and adjust the throttle valve to the first position at described above at 322 of method 300. However, it is important to note that in other embodiments, 328 and 322 may be executed simultaneously, while in still further embodiments 322 may be executed before 328. After determining that the engine torque is between the fourth and third thresholds, and that both 328 and 322 have been executed, method 300 then returns.

Returning to 324, if it is determined that the desired engine torque is not greater than the fourth threshold (e.g., less than the fourth threshold), then method 300 may proceed to 326 which comprises adjusting alternator torque to the upper second level in the manner described above at 320 of method 300. If the alternator torque is already at the upper second level at 326, then the method 300 may comprise maintaining the alternator torque at the upper second level at 326. Method 300 may then proceed from 326 to 322 which comprises adjusting the fuel injection and throttle valve position in the manner described above at 322 of method 300. However, it is important to note that in other embodiments, 326 and 322 may be executed simultaneously, while in still further embodiments 322 may be executed before 326. After determining that the engine torque is below the fourth threshold, and that both 326 and 322 have been executed, method 300 then returns.

It is important to note that in other embodiment, the blocks 304, 310, 316, and 324, may be executed in an order different than that described above. Namely, method 300 may continue first to 324 after estimating and/or measuring engine operating conditions at 302. If the desired engine torque is determined to be less than the fourth threshold at 324, then method 300 continues to 326 which comprises adjusting the alternator torque to the upper second level, and maintaining fuel injection off at 322. However, if the desired engine torque is determined to be greater than the lower fourth threshold at 324, then method 300 may proceed to 316 and determine if the desired engine torque is greater than the intermediate third threshold. If the desired engine torque is determined to be less than the intermediate third threshold, and therefore inbetween the third and fourth thresholds, then method 300 continues to 328 as described above and adjusts alternator torque between the first and second levels in proportion to changes in desired engine torque between the fourth and third thresholds. Further, fuel injection may remain off as described at 322 above. If the desired engine torque is determined to be greater than the third threshold at 316, then may 300 may continue to 310 and determine if the engine torque is greater than the second threshold. If it is determined at 310 that the desired engine torque is less than the second threshold, and therefore in-between the second and third threshold, then the method 300 may continue to 318 as described above. However, if it is determined that the desired engine torque is greater than the second threshold at 310, method 300 may then continue to 304 and determine if the engine torque is greater than the upper first threshold. If it is determined at 304 that the desired engine torque is not greater than the upper first threshold, and is therefore in-between the first and second thresholds, then method 300 continues to 312 as described above. However, if it is determined at 304 that the desired engine torque is greater than the upper first threshold then method 300 continues to 306 as described above.

In this way, fuel injection may only be turned on if the desired torque increases above the second threshold and the delivered engine torque is less than the desired engine torque, and/or if the desired engine torque is in-between the second and third thresholds and one or more of the desired engine torque is increasing, the desired engine torque is greater than the delivered engine torque and the alternator torque is at the lower first level.

In this way, a method may comprise monotonically decreasing an alternator torque from an upper second level to a lower first level, in response to increases in a desired engine torque up to a first threshold. Upon reaching the lower first level, the alternator torque may then be stepped up to the upper second level. Fuel injection, and therefore engine cylinder combustion may also be initiated when stepping up the alternator torque from the lower first level to the upper second level. The method may further comprise adjusting alternator torque in inverse proportion to changes in the desired engine torque above the threshold. Specifically, the method may comprise monotonically decreasing the alternator torque for increases in the desired engine torque above the threshold. Further, in some example, the method may additionally comprise maintaining the alternator torque at the upper second level, and retarding spark timing in response an estimated delivered engine torque being greater than the desired engine torque when the desired engine torque is greater than the threshold.

Thus, method 300 comprises adjusting the engine torque delivered by the vehicle engine in response to changes in the desired engine torque as requested by a vehicle operator. A vehicle operator may request a change in engine torque via an input device which may comprise an accelerator pedal and a brake pedal. In response to changes in the desired engine torque, the engine torque may be adjusted to match the desired engine torque. The engine torque may be adjusted by adjusting one or more of: a fuel injection amount and therefore an intake mass air flow, an alternator torque, and in some examples a spark timing. More specifically, depending on the desired engine torque either the fuel injection amount, or the alternator torque, may be adjusted. For example, for desired engine torques above the first threshold, the alternator torque may be maintained at the lower first level, while the fuel injection amount and therefore the intake mass air flow may be adjusted to compensate for changes in the desired engine torque. Thus, the position of the throttle valve and the amount of fuel injected to the engine may be adjusted to match the actual delivered engine torque to a desired engine torque when the desired engine torque is above the first threshold. Said another way, as the engine torque fluctuates above the first threshold, only the fuel injection amount and intake mass air flow may be adjusted to deliver the desired engine torque.

However, if the engine torque drops below the first threshold, the fuel injection amount is reduced to the lower first amount. Specifically, when the desired engine torque is below the first threshold, but above the second threshold, where the second threshold is less than the first threshold, the fuel injection amount and therefore the intake mass air flow is maintained at a constant amount. The fuel injection amount may be less than the amount of fuel injected at engine torques above the first threshold. If the engine torque is decreasing between the first and second thresholds, then the alternator torque may be increased to match the delivered engine torque to the desired engine torque. Said another way, as the engine torque fluctuates above the second threshold and below the first threshold, only the alternator may be adjusted to deliver the desired engine torque. The alternator torque may be monotonically increased between the first and second levels with decreasing desired engine torque. Thus, in order to compensate for changes in the desired engine torque between the first and second thresholds, only the alternator torque may be adjusted to compensate for changes in the desired engine torque.

In some examples, if the alternator torque is adjusted to the upper second level, but the desired engine torque is between the first and second threshold and is less than the estimated delivered engine torque, then the spark timing may be retarded to provide an additional braking force to the engine. Spark timing may therefore only be retarded if the desired engine torque is between the first and second thresholds, and the alternator torque is not sufficient to bring about a change in the delivered engine torque such that the delivered engine torque matches the desired engine torque.

If the desired engine torque is below the second threshold but above a third threshold, where the third threshold is less than the second threshold, the alternator torque be stepped up to upper second level if the desired engine torque is increasing, and may be stepped down to the lower first level if the desired engine torque is decreasing. Further, the fuel injection may be turned off if the desired engine torque is decreasing, and may be turned on if the engine torque is increasing.

If the desired engine torque is below the third threshold, but above the fourth threshold, the alternator torque is adjusted to match the delivered engine torque to the desired engine torque. Thus, the alternator torque may be adjusted in the same way as when the engine torque fluctuates above the second threshold and below the first threshold. The fuel injection may remain off, and the intake mass air flow may remain constant (e.g., throttle valve position is held constant) while the alternator torque may be adjusted to compensate for changes in the desired engine torque.

If the desired engine torque is below the fourth threshold, the alternator torque may be maintained at the upper second level, and fuel injection may remain off.

In this way, the alternator torque may be adjusted to regulate the delivered engine torque both during engine operating conditions where the fuel is shut off, and when it is turned on. As such, the usage of spark retard may be reduced, and in some examples, spark retard may not be used at all. As described above with reference to FIGS. 1-2, because of the increased charge capacity of the vehicle system, the alternator torque be adjusted between a wider range of values. As such, the alternator may exert a greater braking force of the engine. Due the increased braking capacitance of the alternator, the alternator torque may be used to regulate engine torque at increased engine torque levels. Thus, the fuel efficiency of the engine may be improved, due to the reduction in the usage of spark retard.

In this way, a method may comprise, as a desired engine torque increases: when not injecting fuel to engine cylinders, monotonically decreasing an alternator torque to a first level from a second level; and in response to the alternator torque reaching the first level, stepping up the alternator torque from the first level to the second level while initiating engine combustion, and then monotonically decreasing the alternator torque from the second level to the first level. The second level may be higher than the first level. Further, a current and/or voltage produced by an alternator at the second level is sufficient to power various ancillary electric devices, and charge one or more batteries. Stepping up the alternator torque from the first level to the second level may be approximately instantaneous. Additionally or alternatively, stepping up the alternator torque from the first level to the second level, and the initiating engine combustion may occur simultaneously. The alternator torque may be adjusted by adjusting a current and/or voltage applied to a field coil of the alternator. Thus, decreasing the alternator torque may comprise decreasing electrical power applied to a rotor field coil of the alternator. In some example, the method may further after initiating engine combustion, only monotonically decreasing the alternator torque and not retarding spark timing.

In another example, initiating engine combustion may comprise adjusting a throttle valve from a first position to a second position, where in the second position a greater amount of air may flow to the one or more engine cylinders than in the first position, and increasing an amount of fuel injection to a non-zero threshold. Further, in other examples, monotonically decreasing the alternator torque to the first level may be in response to the desired engine torque increasing above a first threshold, where below the first threshold, the alternator torque may be maintained at the second level. In still further examples, the method may further comprise during engine combustion, in response to the alternator torque reaching the first level, maintaining the alternator torque at the first level, and monotonically increasing a fuel injection amount and intake mass air flow to maintain a desired air/fuel ratio. In some examples, the desired air/fuel ratio may be approximately 14.7:1.

In another representation a method for adjusting an engine torque to match a desired engine torque may comprise: during DFSO, when a throttle valve is in a first position and fuel is not injected to one or more engine cylinders, monotonically decreasing alternator torque to a first torque from a second torque as desired engine torque increases up to a first level; and during cylinder combustion, maintaining the position of the throttle valve in a second position and monotonically decreasing alternator torque from the first torque to the second torque as desired engine torque increases from the first level to a second level, and adjusting the position of the throttle valve between the second position and a third position as desired engine torque increases above the second level. In some examples, the desired engine torque may be an engine torque requested by a vehicle driver via an input device.

The method may further comprise when maintaining the position of the throttle valve in the second position, injecting a first amount of fuel to one or more engine cylinders according to a desired air/fuel ratio. In some examples, an intake mass air flow increases with increasing deflection of the throttle valve from the first position to the second position, and from the second position to the third position. In response to the desired torque reaching the second level, the method may further comprise stepping the alternator torque up from the first level to the second level if the desired torque is decreasing, and stepping down the alternator torque from the second level to the first level if the desired torque is increasing. In still further examples, the method may comprise when the desired engine torque is less than the second level, decreasing the alternator torque when engine torque is less than desired, and increasing alternator torque when engine torque is greater than desired. Additionally or alternatively, the method may comprise retarding spark timing from a desired spark timing during cylinder combustion, when the alternator torque is at the second level, and engine torque is greater than desired.

Turning now to FIG. 4, a graph 400 is shown, depicting adjustments to an alternator torque based on engine operating conditions. Specifically, graph 400 shows changes in a desired torque at plot 402. The desired torque may be an amount of engine torque commanded by a vehicle driver. For example, the desired torque may be estimated by a vehicle controller (e.g., controller 12 from FIG. 1), based on inputs from a vehicle driver via an input device (e.g., input device 192 shown in FIG. 1) which may comprise one or more of a brake pedal and an accelerator pedal. Thus, as explained in greater detail above with reference to FIGS. 1-2, the controller may determine a desired torque based on the position of the input device. In response to changes in the desired torque as requested by a vehicle driver, an amount of fuel to be injected and an amount of air to be flowed to the engine may be adjusted to match the driver demanded torque. Specifically, the controller may determine the desired fuel injection amounts and air flow rates to match the driver desired torque. Changes in the fuel injection amount are shown at plot 402, and changes in the intake air flow rate are shown at plot 404. The operational status of fuel injection and intake mass air flow may be regulated by the controller. The fuel injection amount may be an amount of fuel injected by a fuel injector to one or more engine cylinders as commanded by the controller. Thus, the controller may determine the fuel injection amount based on commands sent to one or more fuel injectors. Similarly, the intake mass air flow rates may be estimated based on a mass airflow sensor in an intake passage of the engine. In other examples, the intake mass air flow rate may be estimated based on a position of a throttle valve in the intake and a one or more pressure sensors in the intake. The intake air flow rate may be a total mass air flow rate of air and/or an air/fuel mixture entering one or more of an intake manifold and an engine cylinder. Further, the fuel injection amount may be determined by the controller based on the estimated intake mass air flow rate, and a desired air/fuel ratio. In one example, the desired air/fuel ratio may be a stoichiometric mixture.

However, in certain engine operating conditions, adjusting the fuel injection amount, and intake mass air flow rate alone may not be sufficient to match the actual delivered engine torque to a driver demanded torque. Additionally, the desired engine torque may decrease below a threshold, where the fuel injection is off and the intake airflow is reduced to a lower first level. Said another way, the desired engine torque may be less than the actual engine torque delivered even when no fuel is being injected to the engine. Thus, the actual torque delivered by the engine may differ from the desired requested by the vehicle driver. Plot 408 shows the torque error, which is the difference between the desired engine torque and the actual delivered engine torque. Level $T_0$ represents approximately zero torque difference. As such, $T_0$, represents a level where the actual delivered engine torque is approximately the same as the desired engine torque. Torque error may fluctuate to below $T_0$, where the actual delivered engine torque is less than the desired engine torque, and to above $T_0$, where the actual delivered engine torque is greater than the desired engine torque.

To compensate for changes in the desired engine torque which may result in the torque error increasing above or decreasing below $T_0$, the alternator torque may be adjusted. Further, as shown below with reference to FIG. 5, the spark timing may be retarded if adjusting the alternator torque is not sufficient to match the actual delivered engine torque to the desired engine torque. Said another way, in some examples, the alternator torque, and/or spark timing may be adjusted in addition to, or in place of, adjusting fuel injection, to adjust the torque output by the engine. Plot 410 shows changes in the alternator torque. As explained above with reference to FIGS. 1-3, adjusting the alternator torque may comprise adjusting the current and/or voltage supplied to an alternator field coil (e.g., field coil 45 shown in FIGS. 1-2). Adjusting the current and/or voltage supplied to the alternator field coil, may change the strength of the magnetic field produced by the field coil, which may in turn may change the load exerted on the engine by the alternator. Specifically, increasing the current and/or voltage applied to the field coil may increase the alternator torque and thereby the load exerted on the engine by the alternator. Thus, increasing the alternator torque may reduce the engine torque. Conversely, reducing the alternator torque may reduce the load exerted on the engine by the alternator, thereby providing an increase the engine torque. The current and/or voltage applied to the field coil may be adjusted by a voltage regulator (e.g., voltage regulator 44 shown in FIGS. 1-2) based on signals received from the controller. Based on torque error, as estimated by the controller, the controller may subsequently send signals to the voltage regulator to adjust the current and/or voltage applied to the field coil, which may comprise adjusting a set point of the voltage regulator.

In some examples, as shown below with reference to FIG. 5, the spark retard may be adjusted by the controller. However, in the example shown in FIG. 4 as seen at plot 412, the spark retard may not be adjusted. Thus, as shown in FIG. 4, only the alternator torque may be adjusted to compensate for changes in the torque error, and not the spark timing. The spark timing may be adjusted to a set point during normal engine operating conditions (e.g. when fuel injection is on). The set point is a point during the compression stroke before top dead center. However, the spark timing may be retarded from the set point to a later point in the compression stroke closer to the top dead center position. Thus, as the amount of spark retard increases, the spark timing moves closer to the top dead center position of one or more pistons in the engine. As a result, the power produced by the engine may be reduced with increasing spark retard. The controller may set the spark timing of the engine based on the estimate torque error. Further, the controller, may send signals to one or more spark plugs in the engine to adjust the timing of spark.

Turning now to graph 400 before $t_0$, the desired engine torque (shown at plot 402) remains below a lower first level $D_0$. However, the desired engine torque may increase up to the first level $D_0$ at $t_0$. Thus, the desired engine torque may be increasing before $t_0$. The lower first level $D_0$, may be a threshold level, above which fuel may be injected to the engine to meet the desired torque. As such, fuel injection may remain off before $t_0$, as shown at plot 404. Thus, the engine may be in a DFSO condition before $t_0$. The intake air flow rate as shown at plot 406, may remain at approximately a lower first level $I_1$ before $t_0$. $I_1$, may be an air flow rate stored in the memory of the controller to be maintained when fuel injection is off. The alternator torque may be at an upper second level $A_2$, before $t_0$. The torque error may decrease from an upper second level $T_2$, before $t_0$, as the desired engine torque increases before $t_0$. Despite the fuel injection being off before $t_0$, and the alternator torque remaining at the upper second level $A_2$, the delivered engine torque may still exceed the desired engine torque before $t_0$. However, as the desired engine torque increases before $t_0$, the torque error may decrease from $T_2$, before $t_0$. Thus, in response to the torque error being greater than $T_0$ before $t_0$, the alternator torque may be maintained at the upper second level, $A_2$. Spark retard remains at a lower first level $S_0$, before $t_0$. The lower first level $S_0$, may be a level where the spark timing is not retarded at all. Thus, the spark timing may not be retarded from the set point before $t_0$.

At $t_0$, the desired engine torque increases above $D_0$, and the torque error decreases to approximately $T_0$. In response to the increase in desired engine torque, and the torque error decreasing to approximately $T_0$, the alternator torque may begin to be reduced from the upper second level $A_2$, at $t_0$. Fuel injection remains off at $t_0$, and the intake air flow remains at the lower first level $I_1$. Further, spark retard remains at $S_0$.

Between $t_0$ and $t_1$, the desired engine torque increases from $D_0$, to an intermediate second level $D_1$. $D_1$ may represent a torque level above which fuel injection is turned on, and below which fuel injection is turned off. Further, $D_1$ may represent a torque level, where the alternator torque is either stepped up from $A_1$ to $A_2$ if one or more of the desired torque is increasing and desired torque is greater than the estimated delivered engine torque, or stepped down from $A_1$ to $A_2$ if one or more of the desired torque is decreasing and desired torque is less than the estimated delivered engine torque. As such, desired torque level $D_1$, may represent a torque level in-between the second and third thresholds described above with reference to method 300 of FIG. 3. In response to the increase in desired engine torque between $t_0$ and $t_1$, the alternator torque is monotonically decreased from the upper second level $A_2$, to a lower first level $A_1$. The lower first level $A_1$, may be an alternator torque level, below which would be insufficient to provide electrical power to various electrical devices (e.g., electrical loads 48 shown in FIGS. 1-2). However in other examples, the lower first level $A_1$, may be approximately zero, and the power to support the electrical devices may come from one or more batteries (e.g., first battery 51 and second battery 46 shown in FIGS. 1-2). In still further examples, $A_1$ may be a non-zero alternator torque level that may represent a power output by the alternator that may greater than zero, but may be insufficient to power the electrical devices. As such, a portion of the power to the electrical devices may be provided by one or more of the batteries. Thus, the alternator torque may be adjusted in inverse proportion to the change in desired engine torque. Fuel injection remains off at between $t_0$ and $t_1$, and the intake air flow remains at the lower first level $I_1$. Further, spark retard remains at $S_0$.

At $t_1$, the desired engine torque increases above $D_1$. In response to the desired engine torque increasing above $D_1$, engine combustion is initiated. Thus, in response to the desired engine torque increasing above $D_1$, fuel injection is turned on, and the amount of fuel injected to the engine is increased to a lower level $F_0$. The lower level $F_0$ may be a non-zero amount of fuel injection. The intake air flow may increase according to the increase in fuel injection to maintain a desired air/fuel ratio. In other examples, the intake air flow may not be increased, and the lower level $F_0$, may be an amount of fuel injection sufficient to maintain a desired air/fuel ratio while not increasing the intake air flow. Thus, the position of the throttle valve may remain in the same position at $t_1$, and the fuel injection may be increased to $F_0$ to establish the desired air/fuel ratio. In some examples the desired air/fuel ratio may be approximately 14.7:1. However in other example the desired air fuel ratio may be greater or less than 14.7:1. Thus, in the example shown in FIG. 4, the intake air flow may increased from $I_1$, to a second level $I_2$. Additionally at $t_1$, the alternator torque may be increased from $A_1$, to $A_2$. In one example, the alternator torque may be stepped up from $A_1$ to $A_2$. Said another way, the alternator torque may be increased from $A_1$ to $A_2$, instantaneously, or nearly instantaneously. In some examples, the alternator torque may be increase from $A_1$ to $A_2$ at the same time as the fuel injection is turned on. Said another way, the increase of the fuel injection to $F_0$, and the increase in the alternator torque to $A_2$ may be simultaneous. However, in other examples, the alternator torque may be increased from $A_1$ to $A_2$ before fuel injection is turned on. At $t_1$, the torque error may remain approximately constant at $T_0$, since fuel injection is turned on, but the alternator torque is increased.

Said another way, the effect of the increase in fuel injection at $t_1$ on the delivered engine torque, may be offset by the increase in alternator torque. Although the increase in fuel injection and intake air flow at $t_1$ may cause an increase in the delivered torque at $t_1$, the increase in alternator torque may cause a decrease in delivered torque. Thus, by increasing the fuel injection, while simultaneously increasing the alternator torque at $t_1$, the delivered torque may be adjusted to match the desired torque. Said another way, increasing the fuel injection at $t_1$, without increasing the alternator torque may result in an increase in delivered torque that would be greater than the increase in the desired engine torque. As a result, the torque error may be greater than $T_0$, if the alternator torque is not increased at $t_1$. So, at $t_1$, the delivered engine torque is approximately the same as the desired engine torque, and therefore the torque error may remain $T_0$ (e.g., zero). Further, spark retard remains at $S_0$.

Between $t_1$ and $t_2$, the desired engine torque increases from $D_1$, to higher third level $D_2$. In response to the increase in desired engine torque between $t_1$ and $t_2$, the alternator torque is monotonically decreased from the upper second level $A_2$, to a lower first level $A_1$ in the manner similar to between time $t_0$ and $t_1$. Thus, the alternator torque may be adjusted in inverse proportion to the change in desired engine torque. Fuel injection remains approximately constant at $F_0$, and the intake air flow remains approximately constant at $I_2$. Further, spark retard remains at $S_0$. Thus, between $t_1$ and $t_2$, although the fuel injection is on, it may remain at $F_0$, and instead of increasing the fuel injection amount and intake air flow to compensate for the increase in desired engine torque, the alternator torque may be reduced. By reducing the alternator torque between $t_1$ and $t_2$, the delivered engine torque may be increased so that the delivered engine torque is approximately the same as the desired engine torque. As such, the torque error remains constant at $T_0$, between $t_1$ and $t_2$. In this way, the delivered engine torque may be adjusted to match the desired engine torque without adjusting the fuel injection and intake air flow amount. Said another way, adjustments to the delivered engine torque may be made by adjusting the alternator torque only, and not adjusting the spark timing, fuel injection amount, and intake mass air flow. Therefore, the fuel efficiency may be increased between $t_1$ and $t_2$.

At $t_2$, the desired engine torque increases above $D_2$. In response to the desired engine torque increasing above $D_2$, fuel injection is increased from $F_0$, to levels above $F_0$ based on an amount of increase in the desired engine torque. Accordingly, the intake air flow is increased from $I_2$ to maintain a desired air/fuel ratio. Additionally at $t_2$, the alternator torque may be remain at the lower first level $A_1$. Thus, the alternator torque may remain at a level so that current and/or voltage generated by the alternator may be sufficient to power one or more of the electrical devices and/or charge the one or more batteries. As described above, since the throttle valve may be located a distance from the engine cylinders, the increase in delivered engine torque due to the increase in fuel injection and intake air flow at $t_2$ may not be immediate. Thus, as shown in the example of FIG. 4 at plot 408, the torque error may decrease below $T_0$ to $T_1$ at $t_2$. Specifically, the delivered engine torque may be less than the desired engine torque. However, in other examples, the torque error may remain constant at $T_0$. Thus, depending on the speed of the intake air flow, and the distance from the throttle to the engine cylinders, the delay in the response of the delivered engine torque to the increase in fuel injection at $t_2$ may be approximately zero, and the increase in fuel injection may provide a nearly instantaneous increase in the delivered engine torque. Further, spark retard remains at $S_0$.

Between $t_2$ and $t_3$, the desired engine torque fluctuates above the higher third level $D_2$. In response to changes in the desired engine torque between $t_2$ and $t_3$, the fuel injection amount and intake air flow are adjusted to match the delivered engine torque to the desired engine torque. Thus, for increases in the desired engine torque, the fuel injection amount and intake air flow may be monotonically increased. Further, the fuel injection amount and intake air flow may be adjusted to maintain the desired air/fuel ratio. For decreases in the desired engine torque the fuel injection amount and intake air flow may be monotonically decreased. Therefore, the fuel injection amount and intake air flow may be adjusted in proportion to the amount of increase and/or decrease in the desired engine torque. Further, if at any time between $t_2$ and $t_3$ the desired engine torque diverges from the delivered engine torque resulting in a torque error greater or less than $T_0$, the fuel injection amount and intake air flow may further be adjusted to match the delivered engine torque to the desired engine torque. In this way, the fuel injection amount and intake air flow, may constantly be adjusted based on changes in the desired engine torque so that the delivered engine torque matches the desired engine torque. As an example, immediately after $t_2$, the fuel injection amount and intake air flow may be increased until the torque error returns to approximately $T_0$. Thus, immediately after $t_2$, the torque error may return to approximately $T_0$, and may remain relatively the same at $T_0$, up to $t_3$. Additionally between $t_2$ and $t_3$, the alternator torque may be remain at the lower first level $A_1$. Thus, the alternator torque may remain at a level sufficient to power one or more of the electrical devices and/or charge the one or more batteries. Further, spark retard remains at $S_0$.

At $t_3$, the desired engine torque decreases below $D_2$. In response to the desired engine torque decreasing below $D_2$, fuel injection is reduced to $F_0$. Accordingly, the intake air flow is reduced to $I_2$ to maintain a desired air/fuel ratio. Additionally at $t_3$, the alternator torque may begin to be increased from the lower first level $A_1$. Torque error may remain relatively the same at $T_0$. Further, spark retard remains at $S_0$.

Between $t_3$ and $t_4$, the desired engine torque decreases from $D_2$, to $D_1$. In response to the decrease in desired engine torque between $t_3$ and $t_4$, the alternator torque is monotonically increased from the lower first level $A_1$ to the upper second level $A_2$. Thus, the alternator torque may be adjusted in inverse proportion to the change in desired engine torque in much the same way as between $t_1$ and $t_2$. However, instead of the desired torque increasing and the resulting alternator torque decreasing as between $t_1$ and $t_2$, the desired torque is decreasing and the resulting alternator torque is increasing between $t_3$ and $t_4$. Fuel injection remains approximately constant at $F_0$, and the intake air flow remains approximately constant at $I_2$. Further, spark retard remains at $S_0$. Thus, between $t_3$ and $t_4$, although the fuel injection is on, it may remain at $F_0$, and instead of adjusting the fuel injection amount and intake air flow to compensate for the decrease in desired engine torque, the alternator torque may be increased. By increasing the alternator torque between $t_3$ and $t_4$, the delivered engine torque may be reduced so that the delivered engine torque is approximately the same as the desired engine torque. As such, the torque error remains constant at $T_0$, between $t_3$ and $t_4$. In this way, the delivered engine torque may be adjusted to match the desired engine torque without adjusting the fuel injection and intake air flow amount in much the same manner as between $t_1$ and $t_2$. Said another way, adjustments to the delivered engine torque may be made by adjusting the alternator torque only, and not adjusting the spark timing, fuel injection amount, and intake mass air flow between $t_3$ and $t_4$.

At $t_4$, the desired engine torque decreases below $D_1$. In response to the desired engine torque decreasing below $D_1$, fuel injection is turned off, and the amount of fuel injected to the engine is decreased to approximately zero. In some examples, the amount of fuel injected to the engine is zero. The intake air flow is decreased to $I_1$ to still allow a threshold amount of air to pass through the engine while fuel is not being injected. Additionally at $t_4$, the alternator torque is decreased from $A_2$, to $A_1$. In one example, the alternator torque may be stepped down from $A_2$ to $A_1$. Said another way, the alternator torque may be decreased from $A_2$ to $A_1$, instantaneously, or nearly instantaneously. In some examples, the alternator torque may be decreased from $A_2$ to $A_1$ at the same time as the fuel injection is turned off. Said another way, the decrease of the fuel injection, and the decrease in the alternator torque to $A_2$ may be simultaneous. However, in other examples, the alternator torque may be decreased from $A_2$ to $A_1$ before fuel injection is turned off. In still further examples, the alternator torque may be decreased from $A_2$ to $A_1$ after fuel injection is turned off. At $t_4$, the torque error may remain approximately constant at $T_0$, since fuel injection is turned off, but the alternator torque is decreased.

Said another way, the effect of the decrease in fuel injection at $t_4$, on the delivered engine torque may be offset by the decrease in alternator torque. Although the decrease in fuel injection and intake air flow at $t_4$ may cause a decrease in the delivered torque at $t_4$, the decrease in alternator torque may cause a corresponding increase in delivered torque. Thus, by decreasing the fuel injection, while simultaneously decreasing the alternator torque at $t_4$, the delivered torque may be adjusted to match the desired torque. Said another way, decreasing the fuel injection at $t_4$, without also decreasing the alternator torque may result in a delivered torque that would be greater than the desired engine torque. As a result, the torque error may be less than $T_0$, if the alternator torque is not decreased at $t_4$. So, at $t_4$, the delivered engine torque is approximately the same as the desired engine torque, and therefore the torque error may remain at $T_0$. Further, spark retard remains at $S_0$.

Between $t_4$ and $t_5$, the desired engine torque decreases from $D_1$ to $D_0$. In response to the decrease in desired engine torque between $t_4$ and $t_5$, the alternator torque is monotonically increased from the, lower first level $A_1$ to the upper second level $A_2$. Thus, the alternator torque may be adjusted in inverse proportion to the change in desired engine torque in a similar manner as described above between $t_3$ and $t_4$. Fuel injection remains off at between $t_4$ and $t_5$, and the intake air flow remains at the lower first level $I_1$. Thus, adjustments to the delivered engine torque between $t_4$ and $t_5$ may be made by adjusting the alternator torque only, and not adjusting the spark timing, fuel injection amount, and intake mass air flow. Further, spark retard remains at $S_0$.

At $t_5$, the desired engine torque decreases below $D_0$. In response to the desired engine torque decreasing below $D_0$, the alternator torque may be increased and maintained at $A_2$. The torque error remains relatively constant at level $T_0$. Fuel injection remains off at $t_5$, and the intake air flow remains at the lower first level $I_1$. Further, spark retard remains at $S_0$.

After $t_5$, the desired engine torque remains relatively constant below $D_0$. In response to the desired engine torque remaining approximately constant below $D_0$, the alternator torque is maintained approximately constant at $A_2$. The torque error remains relatively constant at level $T_0$. Fuel injection remains off at $t_5$, and the intake air flow remains at the lower first level $I_1$. Further, spark retard remains at $S_0$.

It is important to note that graph 400 shows only an example time interval during an engine use. Thus, graph 400 may only show engine operating conditions during a portion of a single engine use. As such, graph 400 may repeat. Said another way, in some examples graph 400 may return to $t_0$ after $t_5$. Further, the desired engine torque may fluctuate back and forth between below $D_0$ and above $D_2$ multiple times during engine use.

Thus, as shown in the FIG. 4, the delivered engine torque may be adjusted by adjusting one or more of the alternator torque, fuel injection and intake air flow. When the desired engine torque is below a lower first level (e.g., $D_0$) and an intermediate second level (e.g., $D_1$), fuel injection may be turned off, and the intake air flow may be reduced to a lower first level (e.g., $I_1$). As such, when the desired engine torque is between the lower first level and the intermediate second level, changes in the desired engine torque may be met by adjusting only the alternator torque. Specifically, in response to the desired engine torque increasing between the first and second levels, the alternator torque may be monotonically decreased from an upper second level (e.g., $A_2$) to a lower first level (e.g., $A_1$). Conversely, the alternator torque may be monotonically increased from the lower first level to the upper second level in response to the desired engine torque decreasing between the second and first levels.

When the desired engine torque reaches the intermediate second level, the alternator torque may be stepped between the lower first level and second level depending on whether the desired engine torque is increasing or decreasing. If the desired engine torque is decrease at the intermediate second level, then the alternator torque is instantaneously or nearly instantaneously stepped down from the upper second level to the lower first level. On the other hand, if the desired engine torque is increasing at the intermediate second level, then the alternator torque is instantaneously or nearly instantaneously stepped up from the lower first level to the upper second level. Further, if the engine torque is increasing at the intermediate second level, then fuel injection is turned on and adjusted to a threshold amount (e.g., $F_0$), and the intake air flow is increased to a threshold level (e.g., $I_2$). However, if the engine torque is decreasing when the engine torque reaches the intermediate second level, fuel injection is turned off, and the intake air flow is adjusted to the lower first level.

When the desired engine torque is between the intermediate second level and a higher third level (e.g., $D_2$), the fuel injection amount and intake air flow are held constant at their respective threshold levels, and only the alternator torque is adjusted to compensate for changes in the desired engine torque. Specifically, in response to the desired engine torque increasing between the second and third levels, the alternator torque may be monotonically decreased from the upper second level to the lower first level. Conversely, the alternator torque may be monotonically increased from the lower first level to the upper second level in response to the desired engine torque decreasing between the third and second levels.

If the desired engine torque increases above the third level, the alternator torque may remain at the lower first level, while adjusting to the engine torque may be made by adjusting the fuel injection amount and intake air flow. Thus, while fuel injection is off, alternator torque may be monotonically reduced with increasing desired engine torque. The alternator torque may then be stepped down to the lower first level to coincide with fuel injection being turned on. Once fuel injection is turned on, the alternator torque may then be monotonically reduced with increasing desired engine torque while the fuel injection amount and intake air flow may be held constant. When the alternator torque is reduced to the lower first level, the fuel injection amount and intake air flow may be increased in response to increases in the desired engine torque. However, in some engine operating conditions, when the fuel injection is turned on and the alternator torque is increased to the upper second level, the delivered engine torque may increase by a greater amount that the desired increase in engine torque. In such situations, as is shown below with reference to FIG. 5, where the fuel injection is on, the alternator torque is at the upper second level, and the desired engine torque is less than the delivered engine torque, spark retard may be employed to reduce the delivered engine torque, and therefore match the delivered engine torque to the desired engine torque.

Turning now to FIG. 5, a graph 500 is shown, depicting adjustments to an alternator torque based on engine operating conditions. Graph 500 shows changes in the desired engine torque at plot 502, fuel injection at plot 504, intake air flow at plot 506, torque error at plot 508, alternator torque at plot 510, and spark retard at plot 512. Thus, the plots in graph 500 show the same engine operating conditions as in graph 400 shown above in FIG. 4. As such, the desired engine torque at plot 502 may be determined and/or estimated in the same manner as described above at plot 402 in FIG. 4. Fuel injection at plot 504 may be determined and/or estimated in the same manner as described above at plot 404 in FIG. 4. Intake air flow at plot 506 may be determined and/or estimated in the same manner described above at plot 406 in FIG. 4. Torque error may be determined and/or estimated in the same manner as described above at plot 408 in FIG. 4. The alternator torque may be estimated and/or adjusted in the same manner as described above at plot 410 of FIG. 4. Spark retard may be estimated and/or adjusted in the same manner as described above at plot 412 of FIG. 4. Further, all of the levels for the fuel injection, intake mass air flow, desired engine torque, torque error, alternator torque, and spark timing (e.g., $A_1$, $A_2$, $D_0$, $D_1$, $D_2$, etc.) are the same as those previously described in FIG. 4

Thus, FIG. 5, may be the same as FIG. 4, except, that in FIG. 5 spark retard may be employed in certain engine operating conditions, whereas in FIG. 4, spark retard is not used. Specifically, the spark timing as shown in FIG. 5, may be retarded when the fuel injection is on, the alternator torque is at the upper second level, $A_2$, and the desired engine torque is less than the delivered engine torque.

Turning now to graph 400 before $t_0$, the desired engine torque (shown at plot 502) remains below a lower first level $D_0$. However, the desired engine torque may increase up to the first level $D_0$ at $t_0$. Thus, the desired engine torque may be increasing before $t_0$. The lower first level $D_0$, may be a threshold level, above which fuel may be injected to the engine to meet the desired torque. As such, fuel injection may remain off before $t_0$, as shown at plot 504. Thus, the engine may be in a DFSO condition before $t_0$. The intake air flow rate as shown at plot 506, may remain at approximately a lower first level $I_1$ before $t_0$. $I_1$, may be an air flow rate stored in the memory of the controller to be maintained when fuel injection is off. The alternator torque may be at an upper second level $A_2$, before $t_0$. The torque error may decrease from an upper second level $T_2$, before $t_0$, as the desired engine torque increase before $t_0$. Despite the fuel injection being off before $t_0$, and the alternator torque remaining at the upper second level $A_2$, the delivered engine torque may still exceed the desired engine torque before $t_0$. However, as the desired engine torque increases before $t_0$, the torque error may decrease from $T_2$, before $t_0$. Thus, in response to the torque error being greater than $T_0$ before $t_0$, the alternator torque may be maintained at the upper second level, $A_2$. Spark retard remains at a lower first level $S_0$, before $t_0$. The lower first level $S_0$, may be a level where the spark timing is not retarded at all. Thus, the spark timing may not be retarded from the set point before $t_0$.

At $t_0$, the desired engine torque increases above $D_0$, and the torque error decreases to approximately $T_0$. In response to the increase in desired engine torque, and the torque error decreasing to approximately $T_0$, the alternator torque may begin to be reduced from the upper second level $A_2$, at $t_0$. Fuel injection remains off at $t_0$, and the intake air flow remains at the lower first level $I_1$. Further, spark retard remains at $S_0$.

Between $t_0$ and $t_1$, the desired engine torque increases from $D_0$, to an intermediate second level $D_1$. In response to the increase in desired engine torque between $t_0$ and $t_1$, the alternator torque is monotonically decreased from the upper second level $A_2$, to a lower first level $A_1$. The lower first level $A_1$, may be an alternator torque level, below which would be insufficient to provide electrical power to various electrical devices (e.g., electrical loads 48 shown in FIGS. 1-2). However in other examples, the lower first level $A_1$, may be approximately zero, and the power to support the electrical devices may come from one or more batteries (e.g., first battery 51 and second battery 46 shown in FIGS. 1-2). In still further examples, $A_1$ may be a non-zero alternator torque level that may represent a power output by the alternator that may greater than zero, but may be insufficient to power the electrical devices. As such, a portion of the power to the electrical devices may be provided by one or more of the batteries. Thus, the alternator torque may be adjusted in inverse proportion to the change in desired engine torque. Fuel injection remains off at between $t_0$ and $t_1$, and the intake air flow remains at the lower first level $I_1$. Further, spark retard remains at $S_0$.

At $t_1$, the desired engine torque increases above $D_1$. In response to the desired engine torque increasing above $D_1$, fuel injection is turned on, and the amount of fuel injected to the engine is increased to a lower level $F_0$. The intake air flow is increased according to the increase in fuel injection to maintain a desired air/fuel ratio. Thus, the intake air flow is increased from $I_1$, to a second level $I_2$. Said another way, in response to the desired engine torque increasing above $D_1$, engine combustion is initiated. Additionally at $t_1$, the alternator torque may be increased from $A_1$, to $A_2$. In one example, the alternator torque may be stepped up from $A_1$ to $A_2$. Said another way, the alternator torque may be increased from $A_1$ to $A_2$, instantaneously, or nearly instantaneously. In some examples, the alternator torque may be increased from $A_1$ to $A_2$ at the same time as the fuel injection is turned on. Said another way, the increase of the fuel injection to $F_0$, and the increase in the alternator torque to $A_2$ may be simultaneous. However, in other examples, the alternator torque may be increased from $A_1$ to $A_2$ before fuel injection is turned on. At $t_1$, the torque error may remain approximately constant at $T_0$, since fuel injection is turned on, but the alternator torque is increased.

Said another way, the effect of the increase in fuel injection at $t_1$ on the delivered engine torque, may be offset by the increase in alternator torque. Although the increase in fuel injection and intake air flow at $t_1$ may cause an increase in the delivered torque at $t_1$, the increase in alternator torque may cause a decrease in delivered torque. Thus, by increasing the fuel injection, while simultaneously increasing the alternator torque at $t_1$, the delivered torque may be adjusted to match the desired torque. Said another way, increasing the fuel injection at $t_1$, without increasing the alternator torque may result in an increase in delivered torque that would be greater than the increase in the desired engine torque. As a result, the torque error may be greater than $T_0$, if the alternator torque is not increased at $t_1$. However, at $t_1$, the increase in alternator torque is not sufficient to offset the increase in engine torque resulting from the fuel injection increasing to $F_0$. Said another way, increasing the fuel injection while simultaneously increasing alternator torque to $A_2$ may still result in the delivered engine torque being greater than the desired engine torque. Thus, at $t_1$, the torque error increases above $T_0$. In response to the increase in torque error, spark retard is increased above $S_0$ at $t_1$. It is important to note, that the increase in torque error at $t_1$ is merely an example situation in which the torque error may be greater than $T_0$. As such, in some examples, not shown in FIG. 5, the torque error may not increase above $T_0$, in response to the initiation of cylinder combustion and increase in alternator torque at $t_1$. The example torque error increase shown at $t_1$, is used to show an example in which the torque error may increase above $T_0$. However, spark retard may be increased under any engine operating conditions so long as the alternator torque is at $A_2$, engine combustion is initiated, and the desired engine torque is less than the estimated delivered engine torque.

Between $t_1$ and $t_2$, the fuel injection remains at $F_0$, and accordingly the intake air flow remains at $I_2$. Additionally, the alternator torque remains constant at the upper second level $A_2$ to provide a braking force on the engine. The desired engine torque continues to increase between $t_1$ and $t_2$. As a result, the torque error may decrease back to $T_0$ between $t_1$ and $t_2$. The torque error may decrease due to one or more the desired engine torque increasing, and the increase in spark retard at $t_1$. The spark retard may be adjusted between $t_1$ and $t_2$, in proportion to the amount of the change in torque error. Thus, as the desired engine torque increases, and thereby the amount of torque error decreases, the amount of spark retard may be decreased. As the spark retard results in a corresponding decrease in the engine torque, thereby reducing the torque error, the amount of spark retard may be reduced. Thus, the amount of spark retard may be proportionate to the torque error. Said another way, spark retard may be increased, until the torque error begins to decrease. Once the torque error begins to decrease, the spark retard may be decreased. Thus, by $t_2$, the torque error may be reduced to approximately $T_0$, and the spark retard may return to $S_0$.

Between $t_2$ and $t_3$, the desired engine torque increases to higher third level $D_2$. In response to the increase in desired engine torque between $t_2$ and $t_3$, the alternator torque is monotonically decreased from the upper second level $A_2$, to a lower first level $A_1$ in the manner similar to between time $t_0$ and $t_1$. Thus, the alternator torque may be adjusted in inverse proportion to the change in desired engine torque. Fuel injection remains approximately constant at $F_0$, and the intake air flow remains approximately constant at $I_2$. Further, spark retard remains at $S_0$. Thus, between $t_2$ and $t_3$, although the fuel injection is on, it may remain at $F_0$, and instead of increasing the fuel injection amount and intake air flow to compensate for the increase in desired engine torque, the alternator torque may be reduced. By reducing the alternator torque between $t_2$ and $t_3$, the delivered engine torque may be increased so that the delivered engine torque is approximately the same as the desired engine torque. As such, the torque error remains constant at $T_0$, between $t_1$ and $t_2$. In this way, the delivered engine torque may be adjusted to match the desired engine torque without adjusting the fuel injection and intake air flow amount. Said another way, adjustments to the delivered engine torque may be made by adjusting the alternator torque only, and not adjusting the fuel injection amount, and intake mass air flow.

At $t_3$, the desired engine torque increases above $D_2$. In response to the desired engine torque increasing above $D_2$, fuel injection is increased from $F_0$, to levels above $F_0$ based on an amount of increase in the desired engine torque. Accordingly, the intake air flow is increased from $I_2$ to maintain a desired air/fuel ratio. Additionally at $t_3$, the alternator torque may be remain at the lower first level $A_1$. Thus, the alternator torque may remain at a level that generates a current and/or voltage by the alternator sufficient to power one or more of the electrical devices and/or charge the one or more batteries. As described above, since the throttle valve may be located a distance from the engine cylinders, the increase in delivered engine torque due to the increase in fuel injection and intake air flow at $t_3$ may not be immediate. Thus, as shown in the example of FIG. 5 at plot 508, the torque error may decrease below $T_0$ to $T_1$ at $t_3$. Specifically, the delivered engine torque may be less than the desired engine torque. However, in other examples, the torque error may remain constant at $T_0$. Thus, depending on the speed of the intake air flow, and the distance from the throttle to the engine cylinders, the delay in the response of the delivered engine torque to the increase in fuel injection at $t_3$ may be zero, and the increase in fuel injection may provide a nearly instantaneous increase in the delivered engine torque. Further, spark retard remains at $S_0$.

Between $t_3$ and $t_4$, the desired engine torque fluctuates above the higher third level $D_2$. In response to changes in the desired engine torque between $t_3$ and $t_4$, the fuel injection amount and intake air flow are adjusted to match the delivered engine torque to the desired engine torque. Thus, for increases in the desired engine torque, the fuel injection amount and intake air flow may be monotonically increased. Further, the fuel injection amount and intake air flow may be adjusted to maintain the desired air/fuel ratio. For decreases in the desired engine torque the fuel injection amount and intake air flow may be monotonically decreased. Therefore, the fuel injection amount and intake air flow may be adjusted in proportion to the amount of increase and/or decrease in the desired engine torque. Further, if at any time between $t_3$ and $t_4$ the desired engine torque diverges from the delivered engine torque resulting in a torque error greater or less than $T_0$, the fuel injection amount and intake air flow may further be adjusted to match the delivered engine torque to the desired engine torque. In this way, the fuel injection amount and intake air flow, may constantly be adjusted based on changes in the desired engine torque so that the delivered engine torque matches the desired engine torque. As an example, immediately after $t_3$, the fuel injection amount and intake air flow may be increased until the torque error returns to approximately $T_0$. Thus, immediately after $t_2$, the torque error may return to approximately $T_0$, and may remain relatively the same at $T_0$, up to $t_4$. Additionally between $t_3$ and $t_4$, the alternator torque may be remain at the lower first level $A_1$. Thus, the alternator torque may remain at a level sufficient to power one or more of the electrical devices and/or charge the one or more batteries. Further, spark retard remains at $S_0$.

At $t_4$, the desired engine torque decreases below $D_2$. In response to the desired engine torque decreasing below $D_2$, fuel injection is reduced to $F_0$. Accordingly, the intake air flow is reduced to $I_2$ to maintain a desired air/fuel ratio. Additionally at $t_4$, the alternator torque may begin to be increased from the lower first level $A_1$. Torque error may remain relatively the same at $T_0$. Further, spark retard remains at $S_0$.

Between $t_4$ and $t_5$, the desired engine torque decreases continues to decrease below $D_2$. In response to the decrease in desired engine torque between $t_4$ and $t_5$, the alternator torque is monotonically increased from the lower first level $A_1$ to the upper second level $A_2$. Thus, the alternator torque may be adjusted in inverse proportion to the change in desired engine torque in much the same way as between $t_2$ and $t_3$. However, instead of the desired torque increasing and the resulting alternator torque decreasing as between $t_2$ and $t_3$, the desired torque is decreasing and the resulting alternator torque is increasing between $t_4$ and $t_5$. Fuel injection remains approximately constant at $F_0$, and the intake air flow remains approximately constant at $I_2$. Further, spark retard remains at $S_0$. Thus, between $t_4$ and $t_5$, although the fuel injection is on, it may remain at $F_0$, and instead of adjusting the fuel injection amount and intake air flow to compensate for decreases in the desired engine torque, the alternator torque may be increased. By increasing the alternator torque between $t_4$ and $t_5$, the delivered engine torque may be reduced so that the delivered engine torque is approximately the same as the desired engine torque. As such, the torque error remains constant at $T_0$, between $t_4$ and $t_5$. In this way, the delivered engine torque may be adjusted to match the desired engine torque without adjusting the fuel injection and intake air amount in much the same manner as between $t_2$ and $t_3$. Said another way, adjustments to the delivered engine torque may be made by adjusting the alternator torque only, and not adjusting the spark timing, fuel injection amount, and intake mass air flow between $t_4$ and $t_5$.

At $t_5$, the fuel injection remains at $F_0$, and accordingly the intake air flow remains at $I_2$. Additionally at $t_5$, the alternator torque is increased to the upper second level $A_2$. However, at $t_5$, the desired engine torque continues to decrease, and as a result the torque error may begin to increase above $T_0$. Since the alternator torque may not be adjusted above $A_2$, the spark timing is retarded at $t_5$ in response to the desired engine torque decreasing at $t_5$. Thus, at $t_5$, spark retard is increased from $S_0$, to $S_1$, in the manner described above at $t_1$.

Between $t_5$ and $t_6$, the fuel injection remains at $F_0$, and accordingly the intake air flow remains at $I_2$. Additionally, the alternator torque remains constant at the upper second level $A_2$ to provide a braking force on the engine. However, the desired engine torque continues to decrease between $t_5$ and $t_6$ until it reaches $D_1$ at $t_6$. As a result, the torque error may continue to increase from the level at $t_5$. The spark retard may be adjusted between $t_5$ and $t_6$, in proportion to the amount of decrease in the desired engine torque, and/or the amount of increase in torque error as described earlier between $t_1$ and $t_2$. Thus, as the desired engine torque decreases, and thereby the amount of torque error increases, the amount of spark retard may be increased. As the spark retard results in a corresponding decrease in the engine torque, thereby reducing the torque error, the amount of spark retard may be reduced as the torque error is reduced. Thus, the amount of spark retard may be proportionate to the torque error. Said another way, spark retard may be increased, until the torque error begins to decrease. Once the torque error begins to decrease, the spark retard may be decreased. Thus, by $t_6$, the torque error may be reduced to approximately $T_0$, and the spark retard may return to $S_0$.

At $t_6$, the desired engine torque decreases below $D_1$. In response to the desired engine torque decreasing below $D_1$, fuel injection is turned off, and the amount of fuel injected to the engine is decreased to approximately zero. In some examples, the amount of fuel injected to the engine is zero.

The intake air flow is decreased to $I_1$ to still allow a threshold amount of air to pass through the engine while fuel is not being injected. Additionally at $t_6$, the alternator torque is decreased from $A_2$ to $A_1$. In one example, the alternator torque may be stepped down from $A_2$ to $A_1$. Said another way, the alternator torque may be decreased from $A_2$ to $A_1$, instantaneously, or nearly instantaneously. In some examples, the alternator torque may be decreased from $A_2$ to $A_1$ at the same time as the fuel injection is turned off. Said another way, the decrease of the fuel injection, and the decrease in the alternator torque to $A_2$ may be simultaneous. However, in other examples, the alternator torque may be decreased from $A_2$ to $A_1$ before fuel injection is turned off. In still further examples, the alternator torque may be decreased from $A_2$ to $A_1$ after fuel injection is turned off. At $t_6$, the torque error may remain approximately constant at $T_0$, since fuel injection is turned off, but the alternator torque is decreased.

Said another way, the effect of the decrease in fuel injection at $t_6$, on the delivered engine torque may be offset by the decrease in alternator torque. Although the decrease in fuel injection and intake air flow at $t_6$ may cause a decrease in the delivered torque at $t_6$, the decrease in alternator torque may cause a corresponding increase in delivered torque. Thus, by decreasing the fuel injection, while simultaneously decreasing the alternator torque at $t_6$, the delivered torque may be adjusted to match the desired torque. Said another way, decreasing the fuel injection at $t_6$, without also decreasing the alternator torque may result in a delivered torque that would be greater than the desired engine torque. As a result, the torque error may be less than $T_0$, if the alternator torque is not decreased at $t_6$. So, at $t_6$, the delivered engine torque is approximately the same as the desired engine torque, and therefore the torque error may remain at $T_0$. Further, spark retard remains at $S_0$.

Between $t_6$ and $t_7$, the desired engine torque decreases from $D_1$ to $D_0$. In response to the decrease in desired engine torque between $t_6$ and $t_7$, the alternator torque is monotonically increased from the, lower first level $A_1$ to the upper second level $A_2$. Thus, the alternator torque may be adjusted in inverse proportion to the change in desired engine torque in a similar manner as described above between $t_4$ and $t_5$. Fuel injection remains off between $t_6$ and $t_7$, and the intake air flow remains at the lower first level $I_1$. Further, spark retard remains at $S_0$. Thus, adjustments to the delivered engine torque between $t_6$ and $t_7$ may be made by adjusting the alternator torque only, and not adjusting the spark timing, fuel injection amount, and intake mass air flow.

At $t_7$, the desired engine torque decreases below $D_0$. In response to the desired engine torque decreasing below $D_0$, the alternator torque may be increased and/or maintained at $A_2$. The torque error remains relatively constant at level $T_0$. Fuel injection remains off at $t_7$, and the intake air flow remains at the lower first level $I_1$. Further, spark retard remains at $S_0$.

After $t_7$, the desired engine torque remains relatively constant below $D_0$. In response to the desired engine torque remaining approximately constant below $D_0$, the alternator torque is maintained approximately constant at $A_2$. The torque error remains relatively constant at level $T_0$. Fuel injection remains off at $t_7$, and the intake air flow remains at the lower first level $I_1$. Further, spark retard remains at $S_0$.

It is important to note that graph 500 shows only an example time interval during an engine use. Thus, graph 500 may only show engine operating conditions during a portion of a single engine use. As such, graph 500 may repeat. Said another way, in some examples graph 500 may return to $t_0$ after $t_7$. Further, the desired engine torque may fluctuate back and forth between below $D_0$ and above $D_2$ multiple times during engine use.

Thus, as shown in the FIG. 5, the delivered engine torque may be adjusted by adjusting one or more of the alternator torque, fuel injection, intake air flow and spark timing. Spark timing may only be retarded when the fuel injection is on, the alternator torque is at the upper second level, $A_2$, and the desired engine torque is less than the delivered engine torque. In this way, a vehicle system may comprise: an engine with one or more cylinders, an alternator mechanically coupled to the engine, a first battery electrically coupled to a starting system for starting the vehicle system and turning on the engine, and selectively electrically coupled to one or more of the alternator and various electrical loads, a second battery electrically coupled to the alternator and the electrical loads, a voltage regulator configured to maintain a voltage and/or current supplied to a field coil of the alternator to a set point, and a controller.

The controller may comprise computer readable instructions for adjusting the voltage and/or current supplied the field coil between a first level and a second level based on engine operating conditions. Further, the computer readable instructions may comprise: when not injecting fuel to the one or more engine cylinders, monotonically decreasing the voltage and or current supplied to the field coil with increasing engine torque demand, and in response to the a desired engine torque reaching a first threshold, stepping up the current and/or voltage supplied to the field coil from the first level to the second level. Additionally or alternatively, the computer readable instructions may comprise when injecting fuel to the one or more engine cylinders, monotonically decreasing the alternator torque with increasing engine torque demand from the first threshold to a second threshold, and maintaining the current and/or voltage supplied to the field coil at the first level in response to the engine torque demand increasing above the second threshold. In some examples, a load exerted on the engine by the alternator increases with increasing voltage and/or current supplied to the field coil.

In this way, a technical effect of improving the precision and responsiveness of engine torque control is achieved, by adjusting the alternator torque during both engine operating conditions where fuel injection is off (e.g., DFSO conditions) and when fuel is being injected to one or more engine cylinders. Since adjusting the alternator torque provides a more immediate change in engine torque than does adjusting the intake air flow and/or fuel injection amount, the precision and responsiveness of the engine torque control may be improved. Specifically, the alternator torque may be monotonically decreased from a higher second level to a lower first level in response to a desired engine torque increasing above a first threshold. Thus, fuel injection may remain off while, the alternator torque is decreased to the lower first level. If the alternator torque reaches the lower first level, and the desired engine torque continues to increase, then fuel injection may be turned on, and the alternator torque may be stepped up to the upper second level. In some examples, the alternator torque and fuel injection may be adjusted simultaneously. In other examples, the alternator torque may be increased before fuel injection is turned on. Additionally, the increase in alternator torque from the first level to the second level may be instantaneous, or nearly instantaneous.

When the fuel injection is turned on, the resulting increase in engine torque may be greater than the desired increase in engine torque. However, by increasing the alternator torque from the first level to the second level when the fuel injection is turned on, a corresponding decrease in the desired engine torque is achieved, and thereby excessive engine torques may be reduced when fuel injection is turned back on from engine operating conditions such as DFSO. Further, by loading the alternator when turning fuel injection back on, such as when exiting a DFSO condition, the alternator may be used to adjust engine torque instead of adjusting the fuel injection amount. Thus, when fuel injection is turned on, and the alternator torque is increased to the upper second level, further increases in the desired engine torque may be satisfied by monotonically decreasing the alternator torque from the upper second level. Said another way, fuel injection and intake air flow may be kept at constant respective levels, while only the alternator torque may be adjusted to compensate for changes in the desired engine torque. As such, the amount of fuel injected to the engine when exiting a DFSO, or turning on one or more fuel injectors may be decreased. Thus, another technical effect of increasing the fuel efficiency of the engine by adjusting the alternator torque and not the spark timing is achieved. By loading the alternator when fuel injection is turned on, the usage of spark retard may be reduced. Instead of reducing the efficiency of the engine by using spark retard, fuel usage may be reduced, while adjusting the engine torque by adjusting the alternator torque.

Further, another technical effect of increasing the allowable current and/or voltage output by the alternator is achieved by incorporating two batteries in a vehicle system. Thus, by increasing the electric power storage capacity of a vehicle system by including an additional battery, the current and/or voltage output by the alternator may be adjusted between a wider range of values. Thus, the current and/or voltage applied to an alternator field coil may be adjusted between a wider range of values, resulting in an increase in the amount of torque exerted on the engine by the alternator. Said another way, the current and/or voltage supplied to an alternator may be increased, due to the increased power that may be accepted by the two battery vehicle system. Thus, the two battery system may be able to absorb the increased current and/or voltage output by the alternator as a result of the increased alternator torque. Consequently the load the alternator is capable of exerting on the engine may be increased. Therefore, the braking force provided by the alternator may be increased. As a result, the usage of spark retard may be reduced, as the effective braking power provided by the alternator may be increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   as a desired engine torque increases:
      when not injecting fuel to engine cylinders, monotonically decreasing an alternator torque to a first level from a second level; and
      in response to the alternator torque reaching the first level, stepping up the alternator torque from the first level to the second level while initiating engine combustion, and then monotonically decreasing the alternator torque from the second level to the first level.

2. The method of claim 1, where a current and/or voltage produced by an alternator at the second level is sufficient to power various ancillary electric devices and charge one or more electrical energy storage devices.

3. The method of claim 1, wherein the stepping up the alternator torque from the first level to the second level is approximately instantaneous.

4. The method of claim 1, wherein the stepping up the alternator torque from the first level to the second level and the initiating engine combustion occur simultaneously.

5. The method of claim 1, wherein the decreasing the alternator torque comprises decreasing electrical power applied to a rotor field coil of an alternator.

6. The method of claim 1, further comprising after initiating engine combustion, only monotonically decreasing the alternator torque and not retarding a spark timing.

7. The method of claim 1, further comprising after initiating engine combustion, maintaining the alternator torque at the second level, and retarding a spark timing from a set point in response to the desired engine torque being greater than an estimated delivered engine torque.

8. The method of claim 1, wherein the initiating engine combustion comprises adjusting a throttle valve from a first position to a second position, where in the second position a greater amount of air flows to the engine cylinders than in the first position, and increasing an amount of fuel injection to a non-zero threshold.

9. The method of claim 1, where the monotonically decreasing the alternator torque to the first level is in response to the desired engine torque increasing above a first threshold, where below the first threshold, the alternator torque is maintained at the second level.

10. The method of claim 1, further comprising during engine combustion, in response to the alternator torque reaching the first level, maintaining the alternator torque at the first level, and monotonically increasing a fuel injection amount and intake mass air flow to maintain a desired air/fuel ratio.

11. The method of claim 10, wherein the desired air/fuel ratio is approximately 14.7:1.

12. The method of claim 1, further comprising coupling an air conditioning (A/C) compressor to the engine cylinders for providing power to the A/C compressor, in response to the desired engine torque being greater than an estimated delivered engine torque.

13. A method for adjusting an engine torque to match a desired engine torque comprising:
during DFSO, when a throttle valve is in a first position and fuel is not injected to one or more engine cylinders, monotonically decreasing alternator torque to a first torque from a second torque as desired engine torque increases up to a first level; and
during cylinder combustion, maintaining a position of the throttle valve in a second position and monotonically decreasing alternator torque from the first torque to the second torque as desired engine torque increases from the first level to a second level, and adjusting the position of the throttle valve between the second position and a third position as desired engine torque increases above the second level.

14. The method of claim 13, wherein the desired engine torque is an engine torque requested by a vehicle driver via an input device.

15. The method of claim 13, further comprising when maintaining the position of the throttle valve in the second position, injecting a first amount of fuel to one or more engine cylinders according to a desired air/fuel ratio.

16. The method of claim 13, wherein an intake mass air flow increases with increasing deflection of the throttle valve from the first position to the second position, and from the second position to the third position.

17. The method of claim 13, further comprising in response to the desired engine torque reaching the second level, stepping the alternator torque up from the first level to the second level if the desired engine torque is decreasing, and stepping down the alternator torque from the second level to the first level if the desired engine torque is increasing.

18. The method of claim 13, further comprising when the desired engine torque is less than the second level, decreasing the alternator torque when engine torque is less than desired, and increasing the alternator torque when engine torque is greater than desired.

19. The method of claim 13, further comprising, retarding spark timing from a desired spark timing during cylinder combustion, when the alternator torque is at the second level, and engine torque is greater than desired.

* * * * *